United States Patent [19]

Arai et al.

[11] Patent Number: 4,658,293
[45] Date of Patent: Apr. 14, 1987

[54] SCANNING CONVERSION METHOD AND SCAN CONVERTER UNIT EMPLOYING THE CONVERSION METHOD

[75] Inventors: Takeshi Arai, Nara; Masami Ebara, Osaka; Hiroyuki Ueyama, Daito, all of Japan

[73] Assignee: Sanyo Electric Co., Ltd., Osaka, Japan

[21] Appl. No.: 748,646

[22] Filed: Jun. 25, 1985

[30] Foreign Application Priority Data

| Aug. 8, 1984 [JP] | Japan | 59-165821 |
| Aug. 17, 1984 [JP] | Japan | 59-172091 |
| Aug. 20, 1984 [JP] | Japan | 59-172916 |
| Oct. 3, 1984 [JP] | Japan | 59-207706 |
| Oct. 3, 1984 [JP] | Japan | 59-207707 |

[51] Int. Cl.⁴ .............................................. H04N 7/01
[52] U.S. Cl. ..................................... 358/140; 358/105
[58] Field of Search ............................. 358/140, 105

[56] References Cited

U.S. PATENT DOCUMENTS 4,364,090 12/1982 Wendland .......................... 358/140
4,573,080 2/1986 Maze ................................... 358/140

Primary Examiner—Howard W. Britton
Attorney, Agent, or Firm—Armstrong, Nikaido, Marmelstein & Kubovcik

[57] ABSTRACT

A scanning conversion method prepares, in order to convert 2:1 interlace scanning video signals formed by $(2N+1)/2$ lines (N: positive integer) into progressive scanning system video signals, a memory (23) having addresses corresponding to $N+1$ lines. The address of the memory (23) for $N+1$ lines are circulated thereby to progressively write the interlace scanning video signals in the addresses while reading the signals from the addresses subjected to the writing at a speed twice that in the writing repeatedly twice.

18 Claims, 21 Drawing Figures

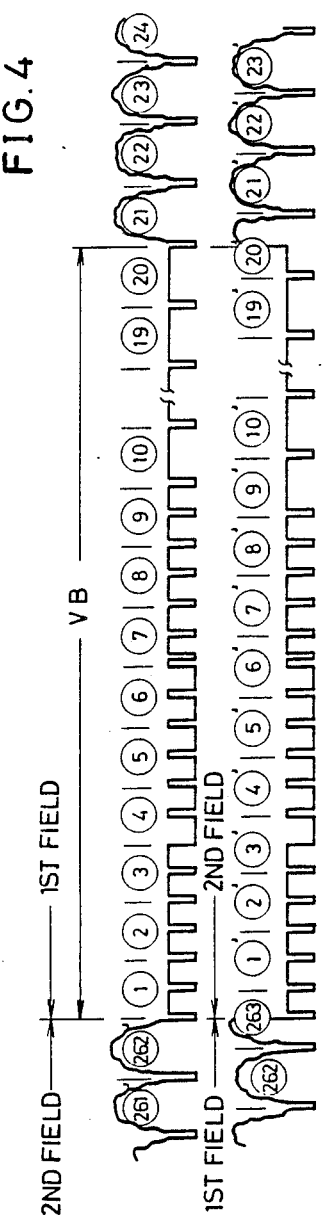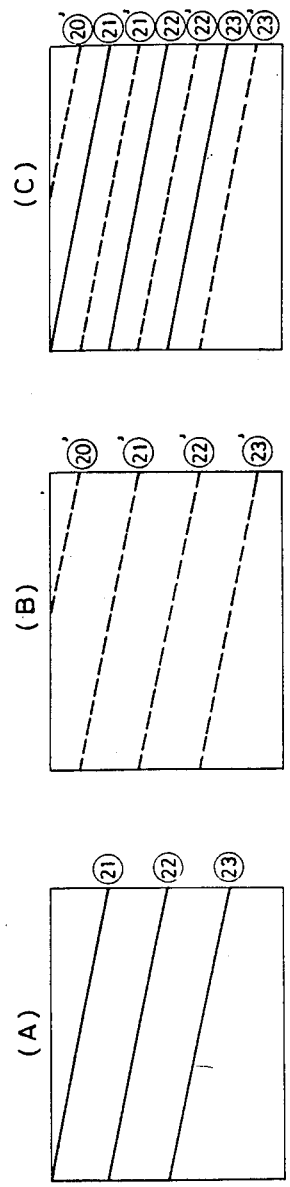

SCANNING CONVERSION METHOD AND SCAN CONVERTER UNIT EMPLOYING THE CONVERSION METHOD

BACKGROUND OF THE INVENTION

1. Field of the Invention

The present invention relates to a scanning conversion method for converting television signal transmitted by an interlace scanning system into those of a progressive scanning system and an apparatus therefor. More particularly, it relates to a method of and an apparatus for converting a 2:1 interlace scanning system into a progressive system.

2. Description of the Prior Art

There has been discussed in the art provision of an apparatus a method for converting interlace scanning system television video signal into progressive scanning system television video signal, in order to remove various influences such as line flickers caused by the interlace scanning system thereby to facilitate overall improvement of the picture quality.

In an NTSC system television signal, for example, field period signals of 262.5 scanning lines are transmitted by interlace scanning per 1/60 sec., thereby to form a frame picture of 525 scanning lines by two fields. In other words, video signals of two different fields are composed per 1/60 sec., thereby to form a frame picture in the period of 1/30 sec. A scan converter unit is adapted to store the transmitted field period signals at prescribed timings and read the same to convert scanning of two field video signals forming one frame, from interlace scanning into progressive scanning, thereby to reproduce high quality picture identical in field frequency to the interlace scanning system and doubled in the number of scanning lines.

FIG. 1 is a block diagram schematically showing the structure of a conventional scan converter unit. Such a scan converter unit temporarily digitalizes an input video signal to perform writing and reading at prescribed timings, thereby to re-generate the same as an analog signal.

Referring to FIG. 1, video-detected input video signal 1 of the 2:1 interlace scanning system is inputted in an analog-to-digital (A-D) converter 2 to be converted into a digital signal, which is written in a storage unit 3 formed by semiconductor memory or the like. The storage unit 3 has periods for writing input data and those for continuously reading the written data in a time divisional manner. The digital signal thus converted and composed by writing and reading timings is progressively output from the storage unit 3. The digital signal read from the storage unit 3 is input in a digital-to-analog (D-A) converter 4 to be converted into analog video signal 5, to be supplied to a display unit (not shown) implemented by a CRT or the like. Respective timings of the A-D converter 2, storage unit 3 and D-A converter 4 are controlled by a timing signal generator 6.

Although the block diagram showing the conventional structure is illustrated with respect to only one signal system and such a circuit may be applied only in a monochrome television receiver processing a luminance signal alone, the circuit as shown in FIG. 1 must be employed for respective one signal systems where processing of a plurality of signals, formed by a luminance signal and color difference signals or respective primary color signals of red, green and blue, is required by application to, e.g., a color television receiver.

The operation of the aforementioned conventional scan converter unit is now described with reference to FIGS. 1 and 2.

FIG. 2 is a diagram for illustrating timings for writing and reading signals of the storage unit 3. Numeral 7, shown in the upper part of FIG. 2, depicts the waveform of the video signal transmitted by 2:1 interlace scanning, and numeral 8, shown under the same, depicts the waveform of vertical deflection current in the interlace scanning. Shown in the lower part of FIG. 2 are timings at which the storage unit 3 performs writing and reading of signals with respect to the aforementioned waveforms 7 and 8 respectively.

In the operation timings of the storage unit 3 as shown in FIG. 2, the abscissa indicates the time and the ordinate indicates memory addresses of the storage unit 3, while discontinuous step-shaped solid lines 9 are illustrative of the writing timings of the storage unit 3, and continuous dot lines 10 are illustrative of the reading timings of the storage unit 3. Further, symbol 1H indicates one horizontal scanning interval in interlace scanning, symbol 1V one vertical scanning interval in interlace scanning and symbol 1H' one horizontal scanning interval in progressive scanning. It is understood from FIG. 2 that the vertical scanning interval 1V is identical in both of the interlace and progressive scanning systems, while one horizontal scanning interval 1H' in the progressive scanning system is half that in the interlace scanning system.

In FIG. 2, the ratio of the horizontal scanning intervals to the vertical scanning intervals is set in 1:7.5 for convenience of illustration. Therefore, 15 scanning lines form one picture frame of two fields (one frame) in this case.

When the video signal 7 transmitted in a specific field, e.g., that shown in the left-hand side in FIG. 2 is written in the storage unit 3, signals for one scanning line are written in a specific address and a subsequent address for one scanning line is emptied so that the video signal 7 for the subsequent one scanning line is written therein, and such writing operation is repeatedly performed. After the video signal 7 for one field is thus written, the video signal 7 for the scanning lines is sequentially written in a subsequent field (shown in the right hand side in FIG. 2) in an empty address interlaced by one line in which no signal is written in the forward field.

Such reading of the video signal 7 written in the aforementioned manner is continuously performed in order of addresses at a speed twice that of reading (in FIG. 2, inclination of the dot lines 10 showing the reading timings is twice that of the solid lines 9 showing the writing timings, whereby it is recognized that the reading speed is twice the writing speed). Such timings of writing and reading are supplied from the timing signal generator 6, as hereinabove described.

Consideration is now made on the operation of the storage unit 3 in one horizontal scanning interval A in a specific field of the video signals 7 of the interlace scanning system currently being writing. Read in a period $a_1$–$a_2$ in the scanning interval A (period $a_1$–$a_2$ is the first half period of the scanning interval A) is the signal written in an address $ADa_1$–$ADa_2$. The signal written in the address $ADa_1$–$ADa_2$ is that in a writing period indicated by leftward extension of the section $ADa_1$–$ADa_2$, i.e., video signal in a 1H period B in a field one field ahead.

Further, read in a second half period $a_2$–$a_3$ of the scanning interval A is the video signal of the 1H period A currently being writing in the interval A.

Thus, the one field video signal read from the storage unit 3 is formed by alternate arrangement of video signals of two continuous fields in the unit of 1H period. Therefore, pictorial images can be reproduced in progressive scanning by displaying a signal which remains identical in vertical deflection frequency to the progressive scanning system and which is doubled in horizontal deflection frequency on a CRT or the like. In other words, reproduced in one field is a pictorial image formed by 15 scanning lines, in the case of this prior art example, in a non-interlace scanning manner. Thus, the scanning system is converted from interlace scanning into progressive scanning.

In the aforementioned description, the ratio of the horizontal scanning intervals to the vertical scanning intervals is set in 1:7.5 for convenience of illustration, and hence 15 scanning lines are present in one field upon conversion into the progressive scanning system. It is to be noted that under the current NTSC system, the ratio of the horizontal scanning intervals to the vertical scanning intervals is 1:262.5, and 525 scanning lines are present in one field upon conversion into the progressive scanning system.

Although writing and reading of signals in one horizontal scanning interval are described as the minimum unit to simultaneously perform writing and reading of the signals in the same storage unit 3, such operations are performed in a time divisional manner in practice.

In the aforementioned prior art example, the storage unit 3 requires X—X' addresses as shown in FIG. 2. In further detail, required as a whole are addresses twice those capable of storing video signal for one field, in order to write the video signal for one field by writing the video signal for one scanning line and emptying addresses in which the signal for one scanning line can be written thereby to write video signals for a subsequent scanning line from the subsequent addresses. The storage unit 3 requires having a capacity which can store video signals for two fields (one frame) as a whole.

An explanation of the scan converter unit, as shown in FIG. 1, is that assuming that sampling is made, in the A-D converter 2, 910 times in one horizontal scanning interval, i.e., that the sampling frequency is four times the color subcarrier in a color television system and the amount of information for one pixel is formed by 8 bits in NTSC system video signals, the amount P of information to be stored for one frame is:

$$P = 910 \times 525 \times 8 = 467 \text{ KB (byte)}$$

whereby the storage unit 3 is required to store an extremely large amount of information.

Therefore, the cost for the storage unit 3 is increased while the storage unit 3 itself is physically made large, and the space occupied by the storage unit 3 is increased upon formation of the scan converter unit.

SUMMARY OF THE INVENTION

It is an object of the present invention to provide a scanning conversion method which can reduce the capacity of a storage unit required for storage conversion.

It is another object of the present invention to provide a small size scan converter unit at a low cost by employing a storage unit having small capacity.

Briefly stated, the present invention provides a scanning conversion method which prepares a storage unit capable of storing video signals for scanning lines in the minimum integer greater than the number of scanning lines forming one field of an interlace scanning system, to progressively write interlace scanning system video signals in respective addresses of the storage unit in a circulating manner, while reading the contents of the addresses being written is repeadly read twice at a speed twice at a speed twice that of writing.

The present invention also provides a scan converter unit including means for controlling writing and reading timings of the aforementioned storage unit.

Therefore, according to the present invention, the storage unit may have such storage capacity that can store about one field of interlace scanning system video signals, and there is no need for a storage unit which can store video signal for two fields as in the conventional case. Thus, the present invention provides a scanning conversion method and an apparatus employing the same which can reduce storage capacity of the storage unit.

The above and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing signal waveforms of first and second fields of video signals of an NTSC system performing 2:1 interlace scanning;

FIG. 5 is an illustration showing states of scanning lines appearing on a display tube by interlace scanning;

DESCRIPTION OF THE PREFERRED EMBODIMENTS

Figure 3:
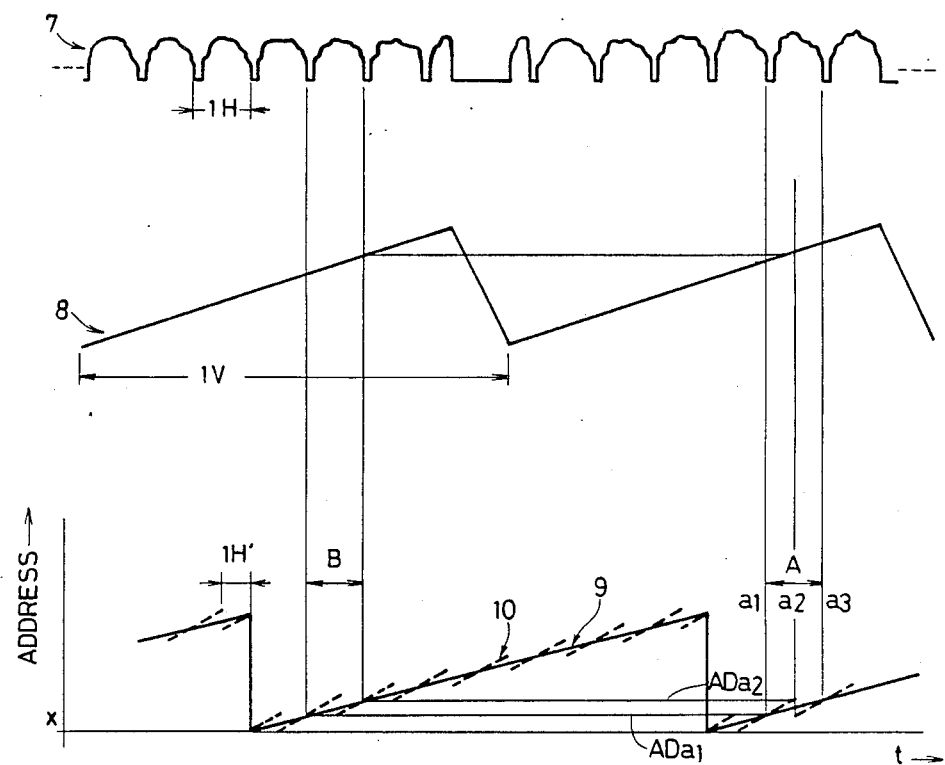
FIG. 3 is an illustration showing operation timings of a storage unit in an embodiment of the present invention.

Referring now to FIG. 3, description is made on a scanning conversion method according to the present invention particularly with respect to operation control of a storage unit for executing the method.

FIG. 3 is a diagram showing operation timings of a first embodiment of the present invention. Referring to FIG. 3, reference numeral 7 indicates the waveforms of video signals transmitted by 2:1 interlace scanning and numeral 8 indicates the waveforms of vertical deflection currents in the interlace scanning. Writing and reading operation timings of a storage unit are shown under the waveforms 7 and 8. Namely, FIG. 3 shows the timings at which the storage unit writes and reads the signals with respect to the video signal waveforms 7 and the vertical deflection current waveforms 8. In the operation timings as shown in FIG. 3, the abscissa indicates the time and the ordinate indicates memory addresses of the storage unit, while solid lines 9 indicate writing timings of the storage unit and dot lines 10 indicate reading timings of the same, which are shown correspondingly to the operation timings of the storage unit in the prior art as shown in FIG. 2.

Figure 1:
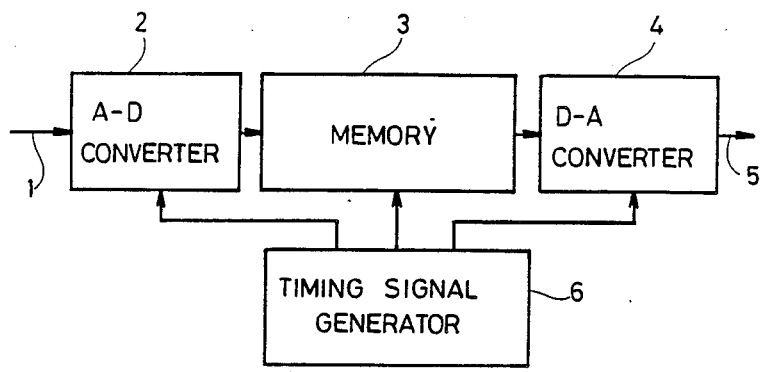
FIG. 1 is a block diagram schematically showing structure of a conventional scan converter unit.
Figure 2:
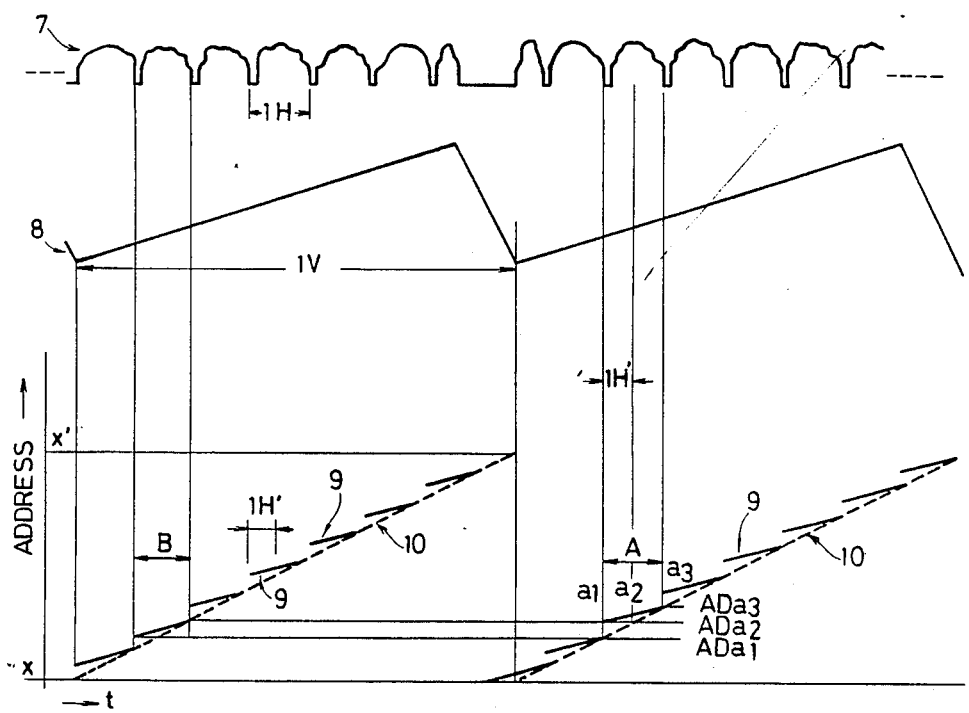
FIG. 2 is a diagram for illustrating signal writing and reading timings of a storage unit.

Further, symbol 1H indicates one horizontal scanning interval in an interlace scanning system and symbol 1V indicates one vertical scanning interval, while symbol 1H' indicates one horizontal scanning interval in progressive scanning, similarly to FIG. 2. As shown in FIG. 3, the vertical scanning interval 1V in the interlace scanning is identical to that in the progressive scanning, whereas the horizontal scanning interval 1H' in the progressive scanning is half that in the interlace scanning.

Also in FIG. 3, the ratio of the horizontal scanning intervals to the vertical scanning intervals is selected to be 1:7.5 for convenience of illustration. Thus, embodied is the 2:1 interlace scanning system in which a picture frame, consisting of 15 scanning lines, is formed by two vertical scanning operations (two fields=one frame).

In order to convert video signals in two fields, respectively formed by $(2N+1)/2$ scanning lines (N: natural number, selected as $N=7$ for 7.5 scanning lines in FIG. 3) and in interlace scanning relation to each other, into progressive system television video signals identical in field frequency (i.e., vertical deflection frequency) and twice in number of scanning lines, employed in this embodiment is a storage unit having addresses for interlace scanning system video signals by $N+1$ scanning lines $((2N+1)/2+(\frac{1}{2})=N+1, N=7$ in FIG. 3). In other words, scanning line conversion can be performed by a storage unit having storage capacity half that in the prior art.

The storage unit is so controlled for writing and reading signal that addresses for $N+1$ scanning lines are circulated in a cyclic manner. As shown in FIG. 3, such circulation of the addresses is not matched with the vertical deflection period 1V, and hence the addresses of the storage unit, in which signals of a specific horizontal scanning interval in respective one of the vertical scanning intervals are written, deviate by those corresponding to writing of signals for $\frac{1}{2}H$. The storage unit is so controlled that a signal on a respective one scanning line in the respective field of the interlace scanning system is sequentially written while the video signal stored in the addresses for the respective one scanning line is repeatedly read twice at a speed twice that of the writing operation.

In such twice-repeated reading, firstly read is the video signal for the field immediately ahead of the field currently being written, and secondly read is the video signal for the current field being written.

In a more detailed description with reference to FIG. 3, now considered in the operation of the storage unit is a horizontal scanning interval A within a specific field. In a period $a_1$-$a_2$ within the horizontal scanning interval A (the period $a_1$-$a_2$ is half the horizontal scanning interval A and corresponds to 1H'), a signal written in an address $ADa_1$-$ADa_2$ is read. The signal written in the address $ADa_1$-$ADa_2$ corresponds to the solid line portions intersecting with thin lines leftwardly extending from the section $ADa_1$-$ADa_2$ in FIG. 3, i.e., the video signal for one scanning line as indicated by one horizontal scanning interval B in the forward field. Further, read in another period $a_2$-$a_3$ in the horizontal scanning interval A is video signal for one scanning line of the field currently being written in this horizontal scanning interval A. Reading of the video signal in the respective one of the periods $a_1$-$a_2$ and $a_2$-$a_3$ is performed at a speed twice the writing operation.

Although writing and reading of signals in one horizontal scanning interval are described as the minimum unit to simultaneously perform writing and reading of the signals in the same storage unit, such operations are performed in a time divisional manner in practice.

Therefore, the video signal information thus read is converted into analog signals to be displayed on a display unit such as a CRT by maintaining the vertical deflection frequency identical to that in the interlace scanning while making the horizontal deflection frequency twice that in the interlace scanning, whereby the pictorial images are converted from interlace scanning system images to those of the progressive scanning system.

This is the feature of the scanning conversion method according to the present invention.

Thus, according to the present invention, the storage capacity of the storage unit may be about half that in the prior art. By comparison, assuming that, when the present invention is applied to a standard NTSC system, sampling is made 910 times a horizontal scanning interval and the amount of information for one pixel is formed by 8 bits, the amount P' of information to be stored is as follows:

$$P' = 910 \times 263 \times 8 = 234 \text{ KB (byte)}$$

It is thus recognized that the aforementioned amount is about half the amount of 467 KB in the prior art.

Figure 6:
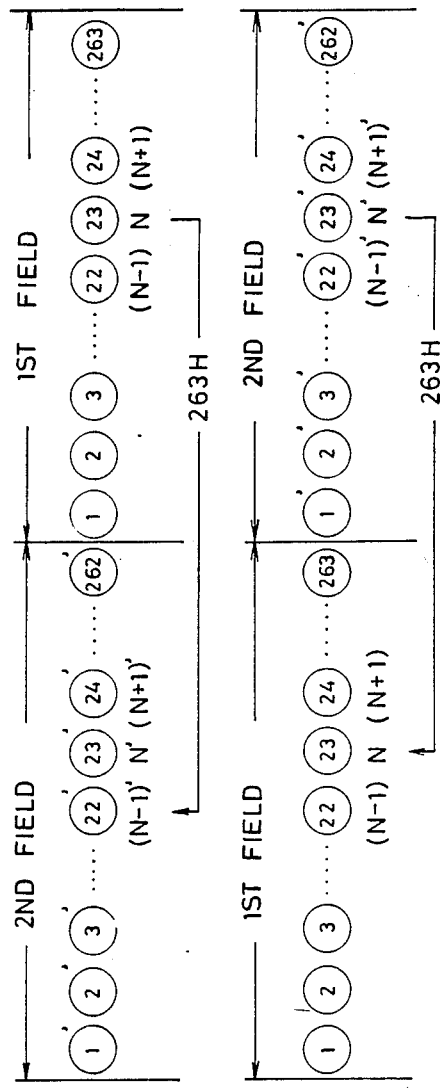
FIG. 6 is a diagram showing signal waveforms for illustrating the operation of the storage unit according to the embodiment of the present invention.

With reference to FIGS. 4 to 6, description is now made on the fact that conversion into progressive scanning is correctly made in the case where the present invention is applied to the NTSC system.

FIG. 4 shows signal waveforms in first and second fields of video signals in the NTSC system performing 2:1 interlace scanning, and symbol VB indicates the vertical retrace interval. The ratio of the vertical deflection cycle to the horizontal deflection cycle is 262.5:1.

For convenience of illustration, the signal waveforms as shown in FIG. 4 are numbered in the following manner: A complete horizontal scanning interval first appearing in the vertical retrace interval of the first field is indicated as circled 1, and the respective horizontal scanning intervals subsequent thereto are numbered as circled 2, circled 3 . . . in order, and a horizontal scanning interval over the rearmost end of the first field and the beginning of the second field is indicated as circled 263. With respect to the second field, a first complete horizontal scanning interval appearing subsequently to the horizontal scanning interval circled 263 is indicated as circled 1', and the respective horizontal scanning intervals subsequent thereto are numbered as circled 2', circled 3', . . . in order. A horizontal scanning interval immediately ahead of the horizontal scanning interval circled 1 of the first field, i.e., the horizontal scanning interval at the rearmost end of the second field is indicated as circled 262'.

FIG. 5 shows the states of scanning lines appearing on the display tube upon interlace scanning of the video signals numbered in the aforementioned manner. In particular, FIG. 5(A) shows the state of the first field and FIG. 5(B) shows that of the second field while FIG. 5(C) shows the state of one frame formed by overlapping the first and second fields. It is obvious from FIG. 5 that a picture frame is formed by interlace scanning of two fields.

A description is now made with reference to FIG. 6 where a storage unit, having addresses for (N+1)=263 scanning lines (because 262.5=(2N+1)/2) with respect to the video signals, perform such interlace scanning to circulate the addresses thereby to write and read signals by the method as hereinabove described with reference to FIG. 3.

One case to consider is the operation of the storage unit where, in a scanning line numbered N or N' (circled 23 or circled 23' selected in FIG. 6), the signal of the scanning line is written in a corresponding address M of the storage unit.

The first time the signal forwardly written in the address M is read from the storage unit, the signal is for the address M of the storage unit one cycle forward, i.e., the video signal signal 263 scanning lines ahead. Therefore, when the number of the currently written scanning line corresponds to N in the first field, the field forward thereto is the second field. The respective scanning lines of the second field are numbered as circled 1' to circled 262', and hence the video signal on the scanning line (N−1) is read as the result. Read in the second time from the address M in the scanning line N is the video signal on the scanning line N which is written in the second time reading.

Similarly, if the number of the scanning line currently being written corresponds to N' in the second field, the field forward thereto is the first field. The respective scanning lines of the first field is arranged from circled 1 to circled 263, whereby the video signal on the scanning line N of the first field is written the first time and the video signal on the scanning line N', which is written during the second reading operation, is read the second time.

Thus, in one field interval of the interlace scanning, the video signal is continuously read from the storage unit as . . . , N−1, (N−1)', N, N', N+1, (N+1)', . . . . Therefore, the video signal is displayed on the display unit such as a CRT, thereby to form progressively scanned pictorial images having doubled scanning lines as shown in FIG. 5(C) in one field interval of the interlace scanning system.

Figure 7:
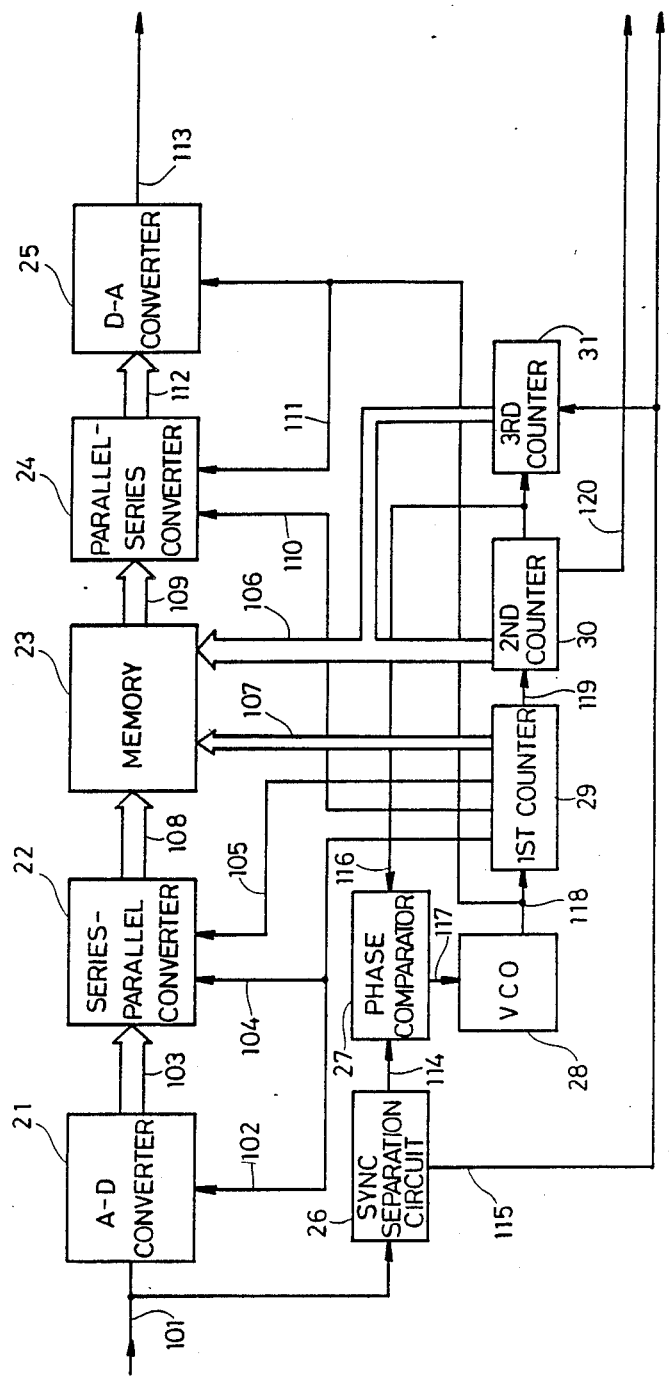
FIG. 7 is a block diagram showing structure of the embodiment of the present invention.

Description is now made on an embodiment of a scan converter unit for implementing the aforementioned scanning conversion method with reference to FIG. 7.

FIG. 7 is a block diagram showing structure of the embodiment of the scan converter unit according to the present invention.

Referring to FIG. 7, numeral 21 indicates an analog-to-digital (A-D) converter, numeral 22 a series-parallel converter, numeral 23 a storage unit, numeral 24 a parallel-series converter, numeral 25 a digital-to-analog (D-A) converter, numeral 26 a synchronizing separation circuit, numeral 27 a phase comparator circuit, numeral 28 a voltage control oscillator (VCO) of a central oscillation frequency of 28.6 MHz, numeral 29 a first counter having the frequency dividing ratio of 1/28, numeral 30 a second counter having the frequency dividing ratio of 1/65 and numeral 31 a third counter having the frequency dividing ratio of 1/256.

Composite video signals 101 of the standard NTSC system as shown in FIG. 4 supplied from the outside are input in the A-D converter 21, to be quantized by sampling clocks 102 of 14.3 MHz (frequency four times the color subcarrier in the NTSC system) obtained from the first counter 29, thereby being input in the series-parallel converter 22 as 8-bit series data 103. Such input is made at the frequency of timing signals 104 (signals identical to the sampling clocks 102). The series-parallel converter 22 is adapted, in order to enable use of general dynamic memories etc. applicable to the storage unit 23, to be compatible with the input signals to the operational speed of the dynamic memories etc. The series-parallel converter 22 converts the series signals of 8 bits for one pixel into parallel signals for 14 pixels, i.e., 8×14 bits. Due to the conversion, the rate of data supplied to the storage unit 23 is reduced to a low speed to:

14.3 MHz/14≈1.02 MHz thereby to enable use of the aforementioned dynamic memories.

The data 108 thus reduced in speed is supplied to the storage unit 23, the storage capacity of which is 112 bits×16K, in accordance with timing pulses 105 of 1.02 MHz supplied from the first counter 29. The storage unit 23 is controlled by address signals 106 supplied from the second counter 30 for specifying addresses and read/write control signals 107 supplied from the first counter 29, whereby the data is progressively written in prescribed addresses.

The data written in the storage unit 23 is read in accordance with the address signals 106 and the read/write control signals 107, thereby to be supplied to the parallel-series converter 24.

In writing and reading operations of the storage unit 23 at this time, the reading operation is performed twice for one writing operation and such operations are as hereinabove described in detail with reference to FIG. 3 etc. as the basic operations of the present invention, and detailed description is herein omitted.

On the basis of timing signals 110 and 111, parallel signals 109 are converted by the parallel-series converter 24 into series data 112, to be further converted into analog signals by the D-A converter 25 on the basis of the timing signals 111 of 28.6 MHz, which is the same as the sampling frequency. Then the analog signals are supplied to a display unit (not shown) as progressive scanning video signals 113, whose horizontal scanning deflection frequency is twice that in interlace scanning.

On the other hand, the composite video signals 101 are also supplied to the synchronizing separation circuit 26, which in turn supplies horizontal synchronizing signals 114 and vertical synchronizing signals 115. These synchronizing signals 114 and 115, timing signals, control signals, address signals and the like are generated with respect to the A-D converter 21, series-parallel converter 22, storage unit 23, parallel-series converter 24 and D-A converter 25 as hereinafter described.

In further detail, the horizontal synchronizing signals 114 separated by the synchronizing separation circuit 26 are input in the phase comparator circuit 27. These input signals 114 are phase-compared with horizontal interval signals 116 obtained by frequency-dividing signals 118 of 28.6 MHz output from the VCO 28 by the first and second counters 29 and 30. Output signals 117 obtained by the result of the comparison are supplied to the VCO 28 as control signals. The phase comparator circuit 27, VCO 28 and first and second counters 29 and 30 thus form a phase control loop, whereby the VCO 28 functions as an oscillator oscillating at the frequency of 28.6 MHz matched in phase with the horizontal synchronizing signals 114. The outputs thereof are supplied as main clocks 118 of 28.6 MHz to the parallel-series converter 24, the D-A converter 25 and the first counter 29.

Various signals generated by the first counter 29 are supplied as control signals to the A-D converter 21, series-parallel converter 22, storage unit 23 and parallel-series converter 24 respectively. Further, outputs 119 from the first counter 29 are signals obtained by frequency-dividing the output signal of VCO 28, and the second counter 30 outputs signals 120 of a frequency twice that of the horizontal synchronizing signals 114, which signals 120 are supplied as horizontal synchronizing signals to the display unit (not shown).

A description of address signals 106 supplied from the second counter 30 and a third counter 31 to the storage unit 23 is as follows.

The second counter 30 is adapted to count up to 65, and the 65th count is matched with the horizontal synchronizing signal 114 by the aforementioned phase control loop. The zero to 63rd count values are counted by the second counter 30 by employing low-order 6 bits supplied as column addresses of the storage unit 23.

On the other hand, the third counter 31 supplies row addresses of the storage unit 23. The third counter 31 receives the vertical synchronizing signals 115 from the synchronizing separation circuit 26, thereby stopping the counting operation for 7 horizontal scanning intervals, i.e., 7 counts within the vertical retrace intervals of the composite video signals 101. Therefore, the third counter 31 counts up to 256 in one vertical scanning interval, whereby the count values of zero to 256 are supplied as the row addresses of the storage unit 23. Thus, the address signals 106 are formed by the row addresses supplied from the third counter 31 and the column addresses supplied from the second counter 30.

The second counter 30 takes values zero to 64 as count values, and when the count values are zero and 64 when the low-order 6 bits are employed as the column addresses of the storage unit 23 as hereinabove described, addresses of the same column are supplied to the storage unit 23, whereby a signal in a part of one horizontal scanning interval is written in the same address to cause a default signal in the read signal. However, such a default signal corresponds to the horizontal synchronizing signals in the composite video signals 101 or approximately the same, and is not valuable as a video signal. This is because, as hereinabove described, the 65th count by the second counter 30 is matched in timing with the horizontal synchronizing signal 114, and hence the signal on the count value zero or 64 of the second counter 30 is the same horizontal synchronizing signals or approximately the same, which are valueless as a video signal in the composite video signals.

The row address signals supplied from the third counter 31 to the storage unit 23 are also adapted to output the same address for 7 counts by receiving the vertical synchronizing signals 115. However, in this case also, the signals around the vertical synchronizing signals are valueless as a video signal, and therefore problems are caused in supplied video signals even if the signal around the vertical synchronizing signals are written in the same address, i.e., even if the signal in the vicinity of the vertical synchronizing signals is a default signal.

Needless to say, such default of the address is adapted to reduce the storage capacity of the storage unit 23 to a minimum.

By virtue of the aforementioned structure, the storage unit 23 is so controlled that the addresses are circulated along a cycle of 263 horizontal scanning intervals. In this regard, applicable to the storage unit 23 are semiconductor memories or the like having addresses $n_{AD}$ of:

$$n_{AD} = (65 - 1) \times (263 - 7)$$
$$= 64 \times 256 = 16{,}384 = 16\text{ K}$$

The total capacity C of the storage unit 23 in this case is:

$$C = 14 \times 8 \times 16\text{ K (bit)}$$
$$= 14 \times 16\text{ K (byte)}$$

whereby the storage unit 23 can be formed by employing 28 semiconductor memories of $4 \times 16$ kilobits.

Thus, according to the present invention, the capacity of a storage unit required for converting interlace scanning system television video signals into progressive scanning system signals can be reduced to about half that of the conventional unit.

Description is now made on a second embodiment of the present invention. The basic principle of the second embodiment as hereinafter described is identical to that of the aforementioned embodiment, whereas operation control for a storage unit is improved in the second embodiment to be adapted to changes in the ratio of vertical scanning intervals to the horizontal scanning intervals.

When the operation mode of a storage unit is set in accordance with an assumed standard system of input video signals (for example, a vertical scanning interval is formed by 262.5 horizontal scanning intervals in the NTSC system), fine scanning conversion cannot be performed on video signals of systems other than the standard system.

On the other hand, standard system video signals are not necessarily generated in video apparatuses other than those for receiving television video signals on the air. For example, it is well known in the art that one vertical scanning interval of reproduced video signals in specific reproduction (fast forward or slow-motion reproduction) of a video tape recorder is formed by 255 to 270 horizontal scanning intervals in comparison with the standard system.

Therefore, in order to optimumly accommodate a scan converter unit to signals supplied from such a video tape recorder, operation control of the storage unit must be adapted to video signals to be scan-converted. In consideration of the aforementioned point, the second embodiment as hereinafter described provides a scan converter unit which can perform fine scanning conversion on non-standard system video signals deviating from the standard system.

Briefly stated, the second embodiment comprises means for detecting the ratio of vertical scanning intervals to horizontal scanning intervals of interlace scanning system input video signals and means for appropriately controlling a storage unit storing video signal information in response to the ratio.

A description is now made for the second embodiment.

Figure 8:
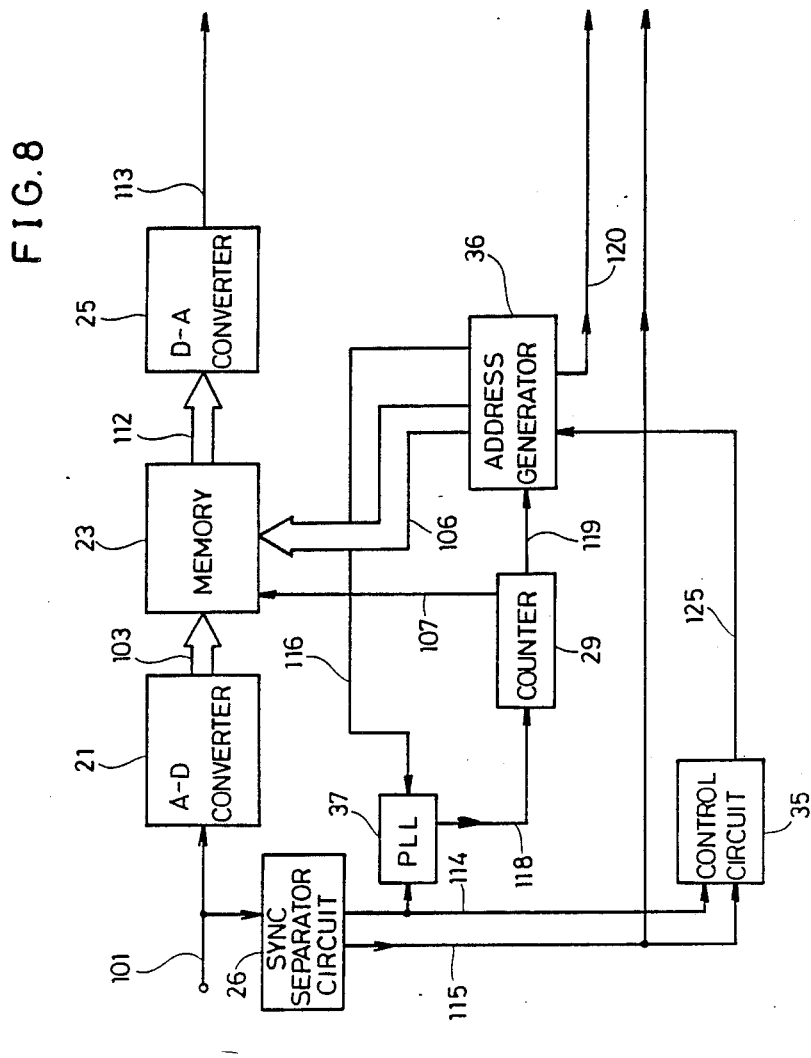
FIG. 8 is a block diagram showing structure of a second embodiment of the present invention.

FIG. 8 is a block circuit diagram showing the structure of the second embodiment. Referring to FIG. 8, the second embodiment is characterized in that a control circuit 35 is provided which receives horizontal synchronizing signals 114 and vertical synchronizing signals 115 from a synchronizing separation circuit 26, so that the control circuit 35 controls an address generator 36 by control signals 125. Another structure of this embodiment is substantially similar to that of the embodiment as shown in FIG. 7, and identical structural elements and signals are indicated by the same reference numerals.

The structure as shown in FIG. 8 is now briefly described.

Television video signals performing 2:1 interlace scanning are converted into digital signals 103 by an A-D converter 21, to be input in a storage unit 23 formed by semiconductor memories etc.

Similarly to the embodiment as shown in FIG. 7, the storage unit 23 has N addresses so as to store the signal on N scanning lines assuming that N represents the minimum integer greater than the ratio of the vertical scanning intervals to the horizontal scanning intervals of the video signals 101. Operations for writing and reading signals to and from the storage unit 23 are controlled by read/write control signals 107 from a counter 29 (corresponding to the first counter 29 in FIG. 7) and address signals 106 from an address generator 36 (corresponding to the second and third counters 30 and 31 in FIG. 7). Data 112 read from the storage unit 23 is converted by a D-A converter 25 into analog video signals 113, to be supplied to a display unit (not shown) such as a CRT.

The input video signals 101 are further supplied to the synchronizing separation circuit 26, which reads the horizontal synchronizing signals 114 and the vertical synchronizing signals 115. The horizontal synchronizing signals 114 are supplied as one input of a phase lock loop (PLL) circuit 37. The PLL circuit 37 is formed by the phase comparator 27 and the VCO 28 as hereinabove described with reference to FIG. 7. The PLL circuit 37 further receives in its other input internal synchronizing signals 116 output from the address generator 36. The PLL circuit 37 controls the horizontal synchronizing signals 114 and the internal synchronizing signals 116 to be matched in phase with each other, thereby to output main clocks 118 serving as basic clocks of the system.

The main clocks 118 are supplied to the counter 29, which in turn outputs the aforementioned read/write control signals 107. Further, output signals 119 from the counter 29 are supplied to the address generator 36. The address generator 36 generates the aforementioned address signals 106 and internal synchronizing signals 116 on the basis of the signals 119. The address generator 36 further generates horizontal deflection synchronizing signals 120 employed for horizontally deflecting output video signals, thereby to supply the same to a horizontal deflection circuit of a display unit (not shown). Similarly to the embodiment as shown in FIG. 7, the synchronizing signals 120 are set at a frequency twice that of the internal synchronizing signals 116.

A description is now made of the control circuit 35 which characterizes this embodiment. The horizontal synchronizing signals 114 and vertical synchronizing signals 115 separated by the synchronizing separation circuit 26 are supplied to the control circuit 35. The control circuit 35 calculates the ratio of one vertical scanning interval to one horizontal scanning interval on the basis of the synchronizing signals 114 and 115 thereby to supply the address generator 36 with signals 125 for instructing change of the operation mode of the storage unit 23 in accordance with the ratio. The address generator 36 changes the address signals by the signals 125 as hereinafter described with reference to FIGS. 9 and 10, thereby to change the circulation cycle of the storage unit 23.

Figures 9, 10:
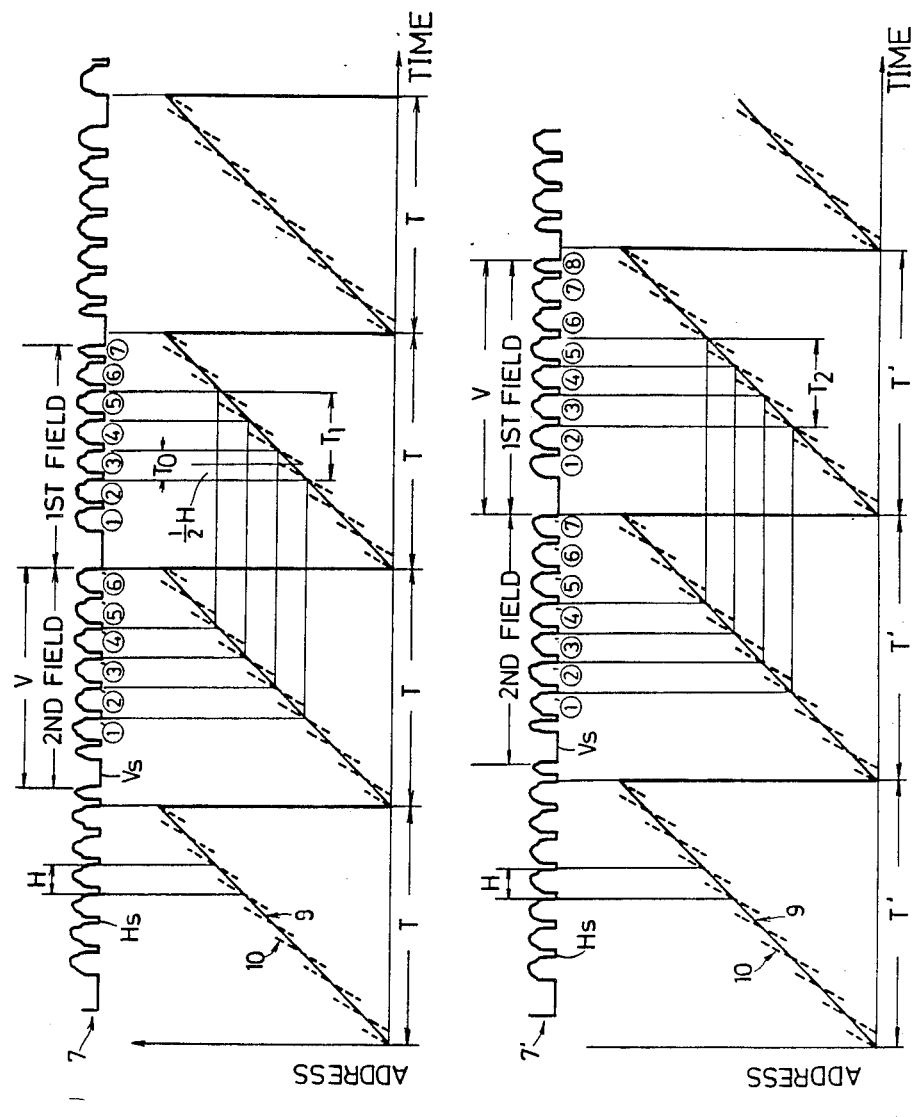
FIG. 9 is illustrative of operation timings of the storage unit according to the second embodiment upon input of video signals transmitted by a standard 2:1 interlace scanning system.
FIG. 10 is illustrative of operation timings of the storage unit according to the second embodiment upon input of video signals transmitted by a non-standard 2:1 interlace scanning system.

FIG. 9 illustrates operation timings of the storage unit 23 upon input of video signals 7 transmitted in the standard 2:1 interlace scanning system. FIG. 10 shows operation timings of the storage unit 23 upon input of video signals 7' transmitted in a non-standard interlace scanning system.

In the following description with reference to FIGS. 9 and 10, the ratio of the vertical scanning intervals to the horizontal scanning intervals is set in 7.5:1 in the standard system video signals 7, while that in the non-standard system video signals 7' is set in 8.5:1. The contents shown in FIGS. 9 and 10 are basically identical to that in FIG. 3, and symbol V indicates one vertical scanning interval, symbol H one horizontal scanning interval in the interlace scanning system, symbol Hs horizontal synchronizing signals, symbol Vs vertical synchronizing singals, and symbol T and T' the circulation cycle of addresses. Thick solid lines show writing timings of the storage unit 23, and dot lines show the reading timings thereof.

Upon calculating the ratio of the vertical scanning intervals to the horizontal scanning intervals on the basis of the input vertical synchronizing signals 115 and horizontal synchronizing signals 114 thereby to detect that the ratio ("7.5" in this case) is of the standard system, the control circuit 35 supplies the address generator 36 with the signals 125. In response to this, the address generator 36 sets the minimum integer greater than the calculated ratio of the vertical scanning intervals to the horizontal scanning intervals as N (N is "8" in this case), thereby to control the storage unit 23 so that the addresses thereof by 8 lines are circulated to progressively write the video signal of a respective one line of respective fields of the input video signals. Thus, the writing operation of the storage unit 23 is performed as the solid line 9 in FIG. 9.

The reading operation of the storage unit 23 is hereafter described with reference to a period $T_0$ (=1H) as shown in FIG. 9. When video signal information for 1H (H: one horizontal scanning interval in interlace scanning), indicated by circled 3, of the first field present in the period $T_0$ is written in addresses of the storage unit 23 for one line, read in the first $\frac{1}{2}$H is video signal for 1H, indicated by circled 2', of the forward field (second field) already written in the addresses for one line, and subsequently read in the latter $\frac{1}{2}$H is video signal, indicated by circled 3, to be written in the period $T_0$. At this time, the respective reading operations are performed at a speed twice the writing speed as hereinabove described. The storage unit 23 is so controlled that such operation is repeatedly performed, whereby signals are read in order of circled 2'—circled 3—circled 3'—circled 4—circled 4'—circled 5 in, for example, a period $T_1$. Thus, signals on respective lines in two fields are alternately read in a time-base compressed manner per $\frac{1}{2}$H, thereby to obtain television video signals of the progressive scanning system, identical in field frequency to the interlace scanning system and doubled in line number, i.e., scan-converted.

In the case where the ratio of the vertical scanning intervals to the horizontal scanning intervals is 7.5:1, scanning conversion is performed in a preferable manner by operating the storage unit 23 by setting the addresses for 8 lines as one circulation cycle. However, when the ratio of the vertical scanning intervals to the horizontal scanning intervals is changed to 8.5:1, such preferable scanning conversion cannot be performed. Therefore, in the second embodiment of the present invention, the control circuit 35 is adapted to detect the ratio of the vertical scanning intervals to the horizontal scanning intervals on the basis of the vertical synchronizing signals 115 and the horizontal synchronizing signals 114 thereby to supply the signals 125 to the address generator 36, so that the storage unit 23 operates its addresses for 9 lines as one circulation cycle.

FIG. 10 shows such a state in which the circulation cycle is set in the aforementioned manner, and similarly to FIG. 9, signals are read in order of circled 2'— circled 3—circled 3'—circled 4—circled 4'—circled 5 in a period $T_2$, whereby scanning conversion is performed in a preferable manner.

Description is now made on a third embodiment of the present invention, which provides a scan converter unit directed to further reduce the capacity of the storage unit 23 in the second embodiment. The third embodiment is different from the second embodiment in that stepping of addresses is stopped in the vicinity of vertical synchronizing signals, similarly to the first embodiment as hereinabove described.

The entire schematic structure of the third embodiment is substantially similar to the second embodiment, and hence FIG. 8 is adopted for describing the third embodiment. Assuming that the ratio of the vertical scanning lines to the horizontal scanning lines of the standard system video signals 7 is 7.5:1 and that of the non-standard video signals 7' is 8.5:1, the number of addresses of the storage unit 23 stores video signal for only 6 lines in the third embodiment. The third embodiment is characterized in that a control circuit 35 is structured as shown in FIG. 11.

Figure 11:
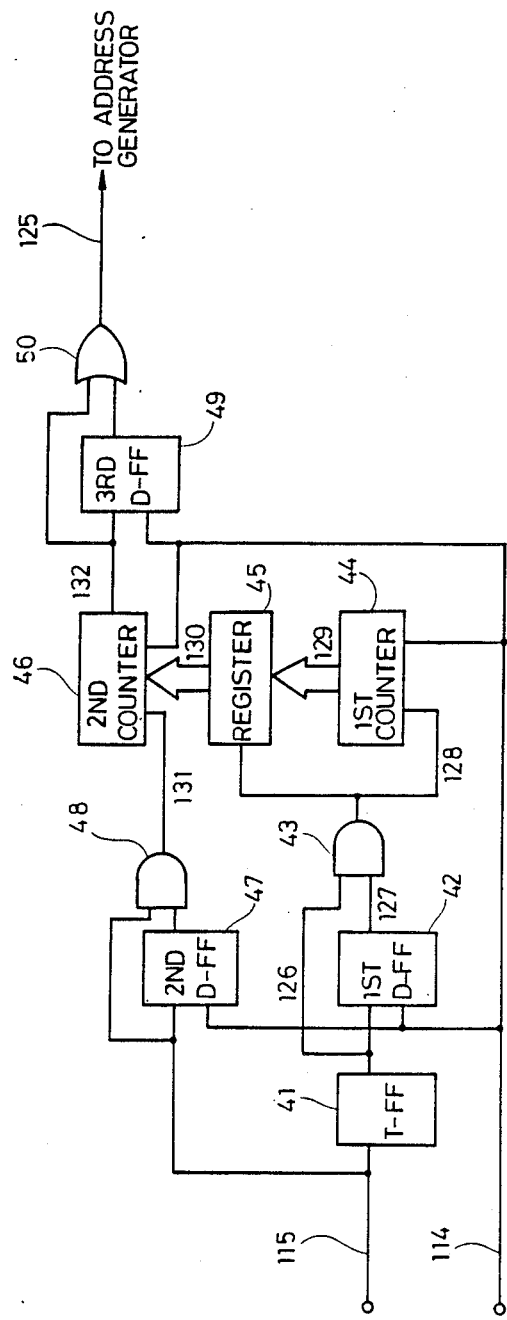
FIG. 11 is a block diagram showing in detail the structure of a control circuit according to a third embodiment of the present invention.

The operation of the control circuit 35 as shown in FIG. 11 is now described with reference to FIGS. 12 and 13.

Figure 12:
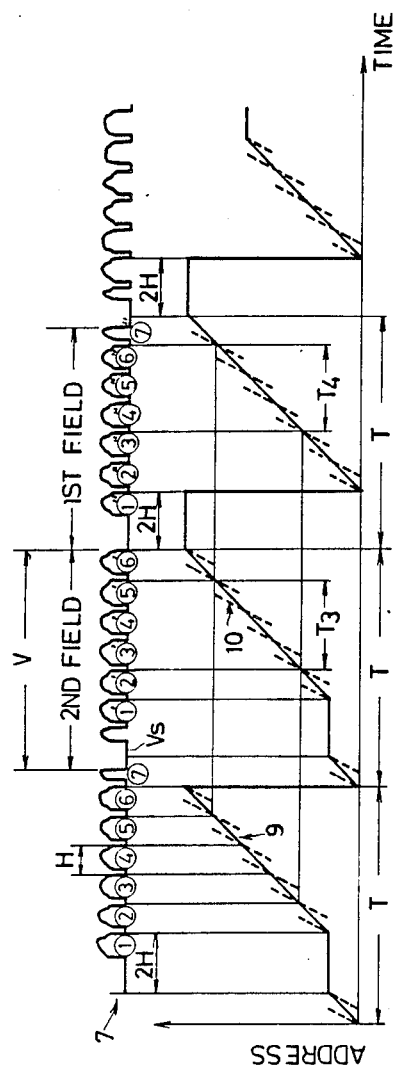
FIG. 12 is a timing chart showing the operation of the third embodiment upon input of standard system video signals.
Figure 13:
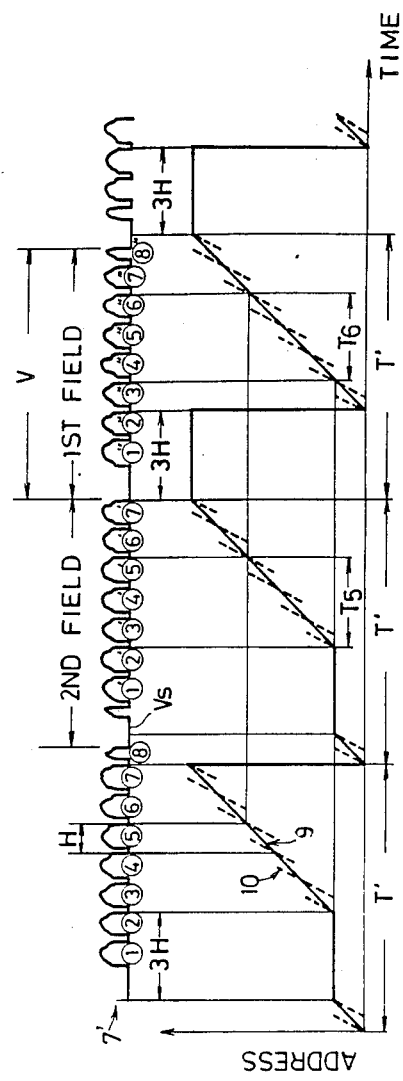
FIG. 13 is a timing chart showing the operation of the third embodiment upon input of non-standard system video signals.

FIG. 12 shows the operation of the third embodiment upon input of standard system video signals, and FIG. 13 shows that upon input of non-standard system video signals. In FIGS. 12 and 13, components identical or corresponding to those in FIGS. 9 and 10 are indicated by the same reference numerals and symbols.

Vertical synchronizing signals 115 are input in a toggle flip-flop (T-FF) 41, which in turn generates pulses 126 in the frame frequency of input video signals 101.

These pulses 126 are supplied to a first delayed flip-flop (first D-FF) 42 to be supplied with output signals 127 of the first D-FF 42 to an AND gate 43, thereby being converted into narrow-width frame cycle pulses. These narrow-width pulses are employed as reset signals 128 for a first counter 44. The first counter 44 is adapted to count up to 12, which is twice the number "6" of horizontal synchronizing signals 114 present in the circulation cycle in continuous operation of the storage unit 23 in the block diagram as shown in FIG. 8, i.e., the period 6H in which addresses are stepped in one circulation cycle of the storage unit 23, and is implemented by a self-return counter which is automatically initialized in a fully counted state. The count value 129 of the first counter 44 is stored in a register 45 immediately before the first counter 44 is reset by the reset signal 128. Therefore, in the case of the input video signals 7 as shown in FIG. 12, fifteen horizontal synchronizing pulses are present in one frame period (two vertical scanning intervals), and hence the first counter 44 counts zero counting 12 horizontal synchronizing pulses and then counts three before it is reset by the reset signal 128, whereby the register 45 supplies the count value "3". Further, in the case of input video signals 7' as shown in FIG. 13, seventeen horizontal synchronizing pulses are present in one frame period, and hence the first counter 44 counts zero upon similarly counting 12 horizontal synchronizing pulses and then counts five before it is reset by the reset signal 128, whereby the register 45 supplies the count value "5". The output 130 from the register 45 is an integer obtained by dividing the count value "3" or "5" by two, i.e., "1" or "2", which is input in a second counter 46. The second counter 46 is reset by pulse signals 131 identical in timing to the vertical synchronizing signals generated by a second delayed flip-flop (second D-FF) 47 and an AND gate 48, thereby to count the horizontal synchronizing signals 114 until the number thereof reaches the value "1" or "2" received from the register 45 and stop its counting operation when the number reaches the value "1" or "2". The second counter 46 outputs "1" (e.g., high level) during counting of the horizontal synchronizing signals 114, and outputs "0" (e.g., low level) after termination of counting. In such an operation, the second counter 46 generates an output 132 which pulses in the width of one horizontal scanning interval (1H) with respect to the input video signals 7 as shown in FIG. 12, and pulses in the width of two horizontal scanning intervals (2H) with respect to the input video signals 7' as shown in FIG. 13. These pulses in the width of 1H and 2H output from the second counter 46 are subjected to further pulse width extension by 1H respectively by a third delayed flip-flop 49 and an OR gate 50, thereby to be output from the OR gate 50 as control signals 125 formed by pulses of 2H or 3H width. These control signals 125 are supplied to the address generator 36, thereby to stop the stepping of addresses of the storage unit 23 by a 2H period with respect to the input video signals 7 as shown in FIG. 12 in the vicinity of the vertical synchronizing signals. These signals are further adapted to stop the stepping of the addresses of the storage unit 23 by a 3H period with respect to the input video signals 7′ as shown in FIG. 13. Thus, the storage unit 23 is operated with the period (T) for 8 lines set as one circulation cycle in the case of FIG. 12 and with the period (T′) for 9 lines set as one circulation cycle in the case of FIG. 13, whereby desired scanning conversion can be performed by a storage unit of reduced storage capacity.

In FIGS. 12 and 13, writing and reading of the video signal are performed in a similar manner to FIGS. 9 and 10 in periods other than those in which the stepping of the addresses of the storage unit 23 is stopped. For example, in periods $T_3$ and $T_4$ in FIG. 12, the signals are read in order of circled 3—circled 3′—circled 4—circled 4′—circled 5—circled 5′ and circled 3′—circled 4″—circled 4′—circled 5″—circled 5′—circled 6″ respectively, and in periods $T_5$ and $T_6$ in FIG. 13, the signals are read in order of circled 3—circled 3′—circled 4—circled 4′—circled 5—circled 5′ and circled 3′—circled 4″—circled 4′—circled 5″—circled 5′—circled 6″ respectively. Thus, it is understood that what is performed is scanning conversion for composing signals in adjacent fields.

Although the signals may be defaulted and the reading order of the signals may be abnormal or approximately the same when stepping of the addresses of the storage unit 23 is stopped, all of these are the signals in the vertical retrace line intervals, which are valueless as video information similarly to the above case, and hence cause no problem in practice.

In the aforementioned embodiment, the stepping of the addresses is stopped in the vicinity of the vertical synchronizing signals, and the storage capacity of the storage unit can be further reduced by stopping the stepping of the addresses also in the vicinity of horizontal synchronizing signals, in which no effective video signal is present.

Figure 14:
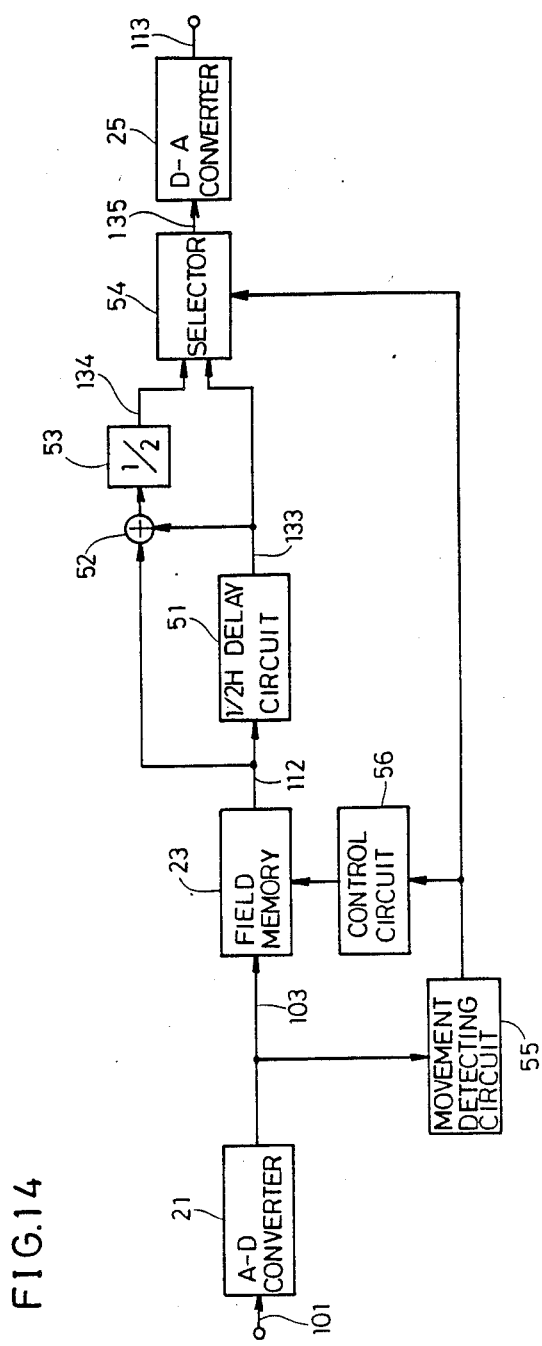
FIG. 14 is a block diagram showing the structure of a fourth embodiment of the present invention.
Figure 15:
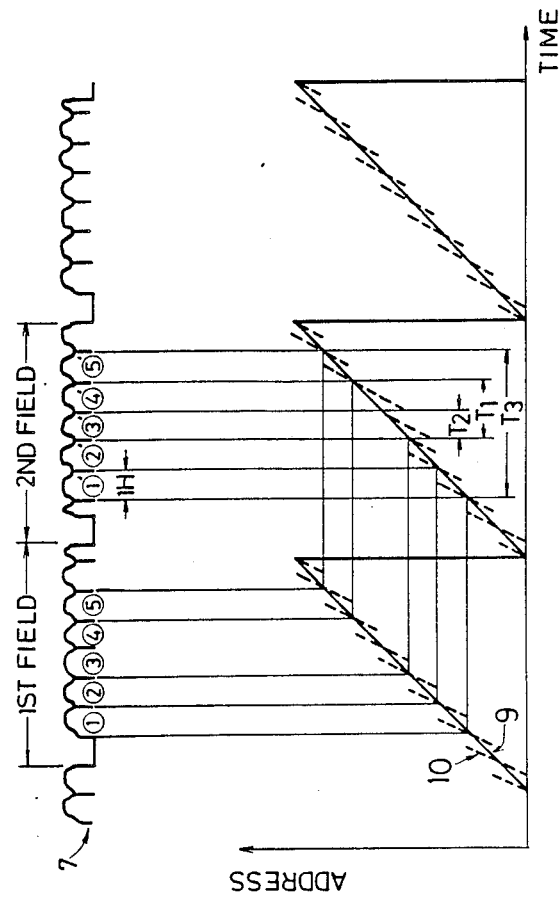
FIG. 15 is a timing chart illustrative of the operation of the fourth embodiment.
Figure 16:
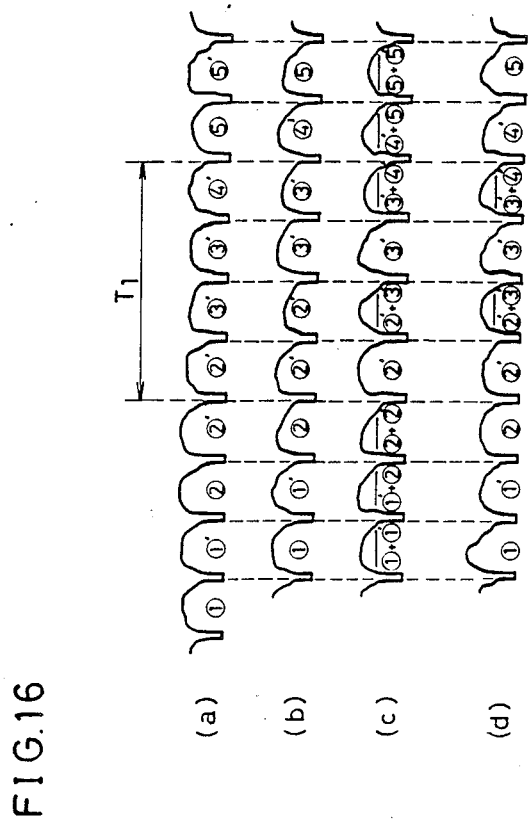
FIG. 16 is a diagram showing output signal waveforms of respective parts of the fourth embodiment.

Description is now made on a fourth embodiment of the present invention with reference to FIGS. 14 to 16.

When the interlace scanning system is scan-converted into the progressive scanning system, the number of scanning lines forming one field is doubled thereby to obtain high definition pictorial images in general. However, when pictorial images to be scan-converted are largely changed in time, pictorial images at any instant are composed with those after 1/60 seconds, i.e., the pictorial images are different from the images an instant before, e.g., the standard NTSC system, leading to degradation in picture quality.

Therefore, added in the fourth embodiment is a circuit which can perform scanning conversion processing to accommodate movement of the pictorial images.

FIG. 14 is a block diagram showing structure of the fourth embodiment. Referring to FIG. 14, numeral 51 indicates a ½H delay memory for delaying output signals 112 from a memory 23 by ½H (H: one horizontal scanning interval in interlace scanning), numeral 52 is an adder for adding up the output signals 112 from the memory 23 with output signals 133 from the ½H delay memory 51, numeral 53 is a coefficient multiplier for multiplying the result of the addition obtained from the adder 52 by a coefficient ½, numeral 54 is a selector for alternatively selecting the output signals 133 from the ½H delay memory 51 or the output signals 134 from the coefficient multiplier 53, and numeral 55 is a movement detecting circuit which obtains inframe difference signals from output signals 103 of an A-D converter 21 thereby to detect movement of the pictorial images exceeding a prescribed level. The operation of the memory 23 is controlled by the outputs from the detecting circuit 55, thereby to control a control circuit 56 (corresponding to the first, second and third counters 29, 30 and 31 in FIG. 7) and the selector 54 as hereinafter described.

The other structures are similar to FIGS. 7 and 8, and identical components are indicated by the same reference numerals and symbols while description thereof is herein omitted.

A description is now made for the operation of the fourth embodiment with reference to FIG. 15 showing a timing chart illustrative of the operation of the memory 23 and FIG. 16 showing waveforms of respective output signals of FIG. 14.

In FIG. 15, the television video signal waveforms 7 performing 2:1 interlace scanning are set at 7.5:1 in the ratio of vertical scanning intervals to horizontal scanning intervals similarly to the embodiments in the foregoing description for convenience of illustration, while respective lines of first and second fields are indicated by circled numbers as shown therein. With respect to the video signal waveforms 7, a memory 23 performs writing operations as indicated by sold lines and reading operations as indicated by broken lines.

Also in this embodiment, the fields are respectively formed by $(2N+1)/2$ lines (N: natural number, N is "7" in this embodiment) in order to convert video signals for two fields in interlace scanning relation to each other into television signals of the progressive scanning system doubled in line number, the memory 23 has addresses for storing signal of $N+1$ scanning lines ($N=8$ in this case). The control circuit 56 is adapted to control circulation of the addresses for 8 lines, so that video signal for one line of the respective field is progressively written in the respective address. The writing operation is performed regardless of the detection output of the movement detecting circuit 55, i.e., substantially identically performed regardless of movement, while the operation for reading a signal from the memory 23 varies with the movement.

A period $T_1$ in FIG. 15 shows the reading operation of the memory 23 in the case where the movement detecting circuit 55 determines that movement is present, and periods other than the period $T_1$ are illustrative of the reading operations of the memory 23 in the case where a determination is made that no movement is present.

The reading operation of the memory 23 controlled by the control circuit 56 upon detection of no movement by the movement detecting circuit 55 is identical to those in the aforementioned embodiments, and description is now made on the reading operation of the memory 23 controlled by the control circuit 56 upon detection of movement by the movement detecting circuit 55 with reference to a period $T_2$.

The memory 23 is so controlled to read, during when video signals circled 3′ of the second field, present in the period $T_2$, are written in addresses for one line, when video signals circled 2′ of the current field (second field)

written in addresses for one line immediately ahead of the addresses for one line at a speed twice the writing speed in the first ½H period and then read video signals circled 3' written in period T₂ at a speed twice the writing speed in the second ½H period. By virtue of such control, interpolation signals are generated by employing only video signal information of the current field (second field in FIG. 15) in the presence of movement while the same are time-base compressed to be read.

Since the memory 23 is thus controlled, video signal information 112 read from the memory 23 in a period T₃ in FIG. 15 enters a state as shown in FIG. 16(a), and the interpolation signals are generated by employing only the video signals in the current field as indicated by the period T₁ in the case where movement of the pictorial images is present, thereby to reduce degradation of the picture quality caused by the movement of the pictorial images.

The signals as shown in FIG. 16(a) may be directly supplied to the D-A converter 25 to be displayed on a display unit, whereas the present embodiment adopts processing as hereinafter described in order to further improve the picture quality.

Namely, the signals as shown in FIG. 16(a) read from the memory 23 are delayed by a ½H delay memory 51 by ½H (H: one horizontal scanning interval in interlace scanning system, i.e., one-line signals read from the memory 23) as signals 133 (FIG. 16(b)) to be supplied as one input of the selector 54. The selector 54 is supplied as the other input signals 134 as shown in FIG. 16(c) obtained by adding up and averaging signals 112 and the signals 133 by the adder 52 and the coefficient multiplier 53. The selector 54 is so controlled by the movement detecting circuit 55 as to select the signals 133 upon a determination that no movement is present and to select the signals 134 upon a determination that there is movement, thereby to output signals 135 as shown in FIG. 16(d). The signals 135 are supplied to the D-A converter 25 to be converted into analog video signals 113, which are deflected at the horizontal deflection frequency twice that in the interlace scanning system and the vertical deflection frequency identical to that in the interlace scanning system, thereby to produce progressive scanning frames on the display unit (not shown). Thus, mean value signals of adjacent lines of the same field are obtained as interpolation signals generated in the period T₁, whereby improvement of the picture quality is further facilitated.

In FIG. 16, signals circled 2'+circled 3', for example, are indicative of signals representing mean values of the signals circled 2' and circled 3'. Since this embodiment processes A-D converted digital signals, the video signal information cannot be indicated by waveforms as shown by numeral 7 in FIG. 15 and in FIG. 16, whereas the signals are expressed as analog video signals for convenience of illustration.

Thus, according to the fourth embodiment, obtained are the progressive scanning system television signals formed by the video signals in the current field and the video signals in the same field as shown by the period T₁ in FIG. 16 in the case where movement of the pictorial images is present while the progressive scanning system television signals consisting of interpolation signals formed by the video signals in the current field and those in the forward field are obtained in the case where no movement of the pictorial images is present, and hence high resolution pictorial images can be formed with reduced degradation of picture quality.

Figure 17:
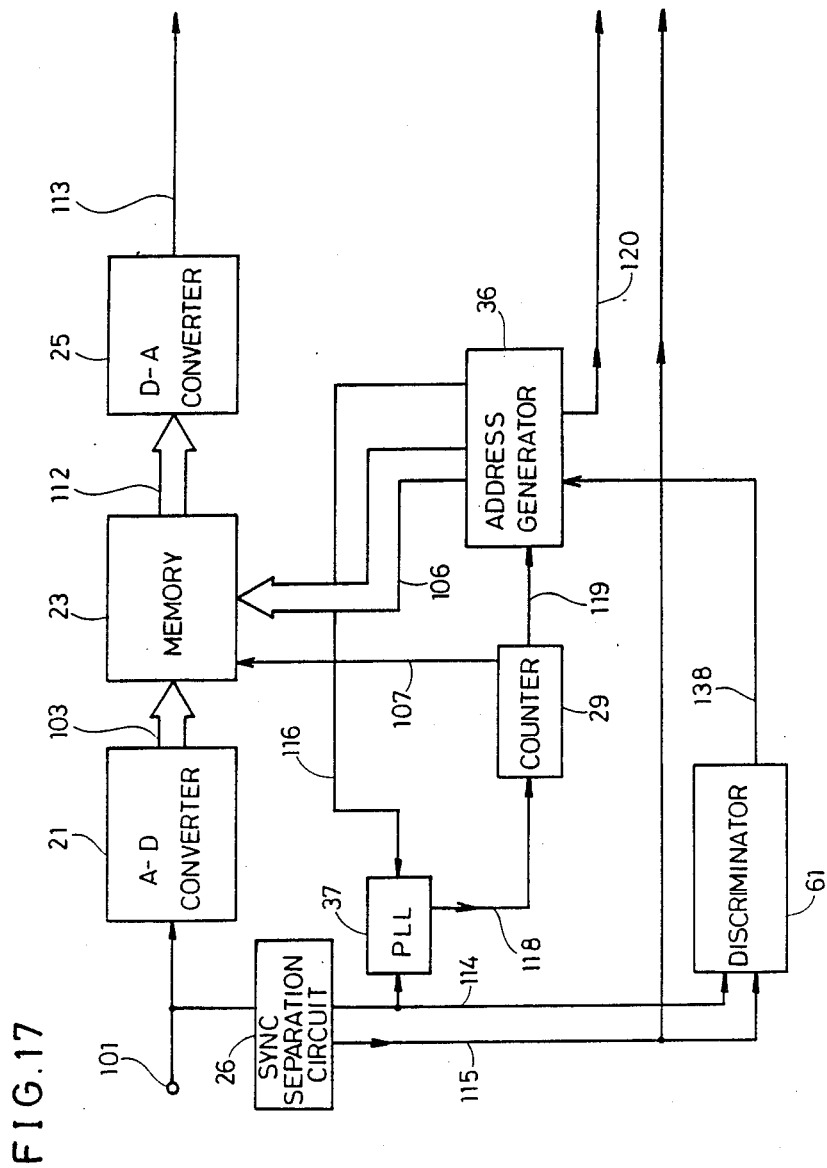
FIG. 17 is a block diagram showing the structure of a fifth embodiment of the present invention.
Figure 18:
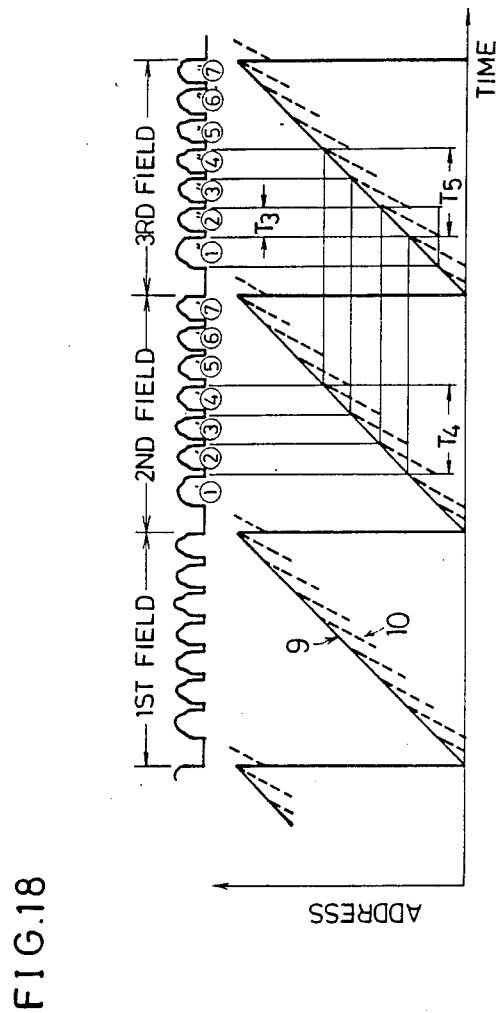
FIG. 18 is a timing chart showing the operation of the fifth embodiment.

Description is now made on a fifth embodiment of the present invention with reference to FIGS. 17 and 18.

The following points should be considered in the fifth embodiment: Namely, in an apparatus for scan-converting the interlace scanning system into a progressive scanning system, input video signals may not be in an interlace scanning system. For example, in case of graphic pictorial image signals generated by a computer unit, the signals may be originally formed by the progressive scanning system. Therefore, when the scan converter unit receives the progressive scanning system video signals from the computer unit etc. in addition to the normal television video signals of 2:1 interlace scanning system, the operation of the scan converter unit must be adapted to the types of signals received.

Referring now to FIG. 17, the feature of the fifth embodiment resides in a discriminator 61 which is provided for discriminating the scanning system of input video signals 101, thereby to control the operation of an address generator 36.

Namely, vertical synchronizing signals 115 obtained from a synchronizing separation circuit 26 are supplied as one input of the discriminator 61 while horizontal synchronizing signals 114 are supplied as the other input of the discriminator 61. The discriminator 61 makes a determination that, on the basis of the input vertical and horizontal synchronizing signals 115 and 114, that the input video signals 101 are in the interlace scanning system when two cycles (two vertical scanning intervals) of the vertical synchronizing signals 115 are an odd number of times a cycle (a horizontal scanning interval) of the horizontal synchronizing signals 114, while determining that the input video signals 101 are in the progressive scanning system when the two cycles are an even number of times a cycle. The discriminator 61 supplies a signal 138 which indicates the type of scanning system of the input video signals to the address generator 36. The address generator 36 changes the address information by the state of the signal 138 as hereinafter described.

Other circuits and signals forming the embodiment as shown in FIG. 17 are similar to those of the embodiment as shown in FIG. 8, and identical or corresponding components are indicated by the same reference numerals, and description thereof is omitted.

FIG. 18 is a timing chart showing the operation of a storage unit 23 in relation to input signal waveforms 7 where the input video signals 101 are determined by the discriminator 61 to be in the progressive scanning system and the address generator 36 is set by the signal 138 in a second mode accommodated to the progressive scanning system. In FIG. 18, the abscissa is indicative of the time, the ordinate the addresses of the storage unit 23, the solid lines the writing timings and the broken lines the reading timings respectively. Similarly to the aforementioned description of the respective embodiments, the ratio of the vertical scanning intervals of the input video signals to the horizontal scanning intervals is set smaller than that in the present NTSC system for convenience of illustration, i.e., in 8:1. For similar reasons, waveforms of signals close to the vertical synchronizing signals are shown in a simplified manner, while respective lines in the first and second fields are indicated by circled numbers as shown.

Also in the fifth embodiment, the writing operation of the storage unit 23 is substantially similar to that in the respective one of the aforementioned embodiments whether the address generator 36 is in the first mode accommodated to the interlace scanning system or in a second mode. Namely, the writing operation of the storage unit 23 is so performed as to circulate, assuming that N represents the minimum integer greater than the ratio of the vertical scanning intervals of the input video signals to the horizontal scanning intervals ("8" in this case), addresses for 8 lines thereby to progressively write video signal information for respective one line of the respective field of the input video signals.

On the other hand, the storage unit 23 has different operations for the first and second modes.

First, the operation of the storage unit 23 where the address generator 36 is set in the first mode is completely the same as that described above with reference to FIG. 9, for example.

However, when the address generator 36 is set in the second mode, the storage unit 23 operates as follows: With respect to, for example, a period $T_3$ in FIG. 18, when video signal information circled 2″ of a third field present in the period $T_3$ is written in addresses for one line, video signal information circled 1″ in the current field (third field) written in addresses for one line immediately ahead of the said one line addresses is read at a speed twice the writing speed in the first ½H period of the period $T_3$. Subsequently, video signal information circled 2″ written in the said period $T_3$ is read at a speed twice the writing speed in the second ½H period of the period $T_3$. The storage unit 23 is so controlled that the operation is repeatedly performed, and hence signals are read in, e.g., a period $T_4$ in order of circled 1′—circled 2′—circled 2′—circled 3′—circled 3′—circled 4′ and similarly in order of circled 1″—circled 2″—circled 2″—circled 3″—circled 3″—circled 4″ in a period $T_5$. Namely, interpolation signals are formed by adjacent lines of the same field. The respective signals are read in a time-base compressed manner in this case, as a matter of course.

The video signal information thus read in the respective operation modes is deflected at a horizontal deflection frequency twice the horizontal cycle of the input video signals and a vertical deflection frequency identical to the vertical cycle of the input video signals, thereby to form progressive scanning pictorial images having doubled scanning lines.

The aforementioned reading operation can be easily set in the first or second mode by delaying reading addresses (shown by broken lines in FIG. 18) by ½ periods, and it may be understood that such change can be simply performed.

Thus, the fifth embodiment can be adapted to the video signals of both interlace and progressive scanning systems in a preferable manner, thereby to obtain high definition pictorial images.

Although the aforementioned five embodiments respectively have specific features, the respective embodiments can be freely combined to implement a scan converter unit which can be accommodated to various changes in the input video signals. For example, combination of the third and fourth embodiments is applicable to a scan converter unit which can be suitably accommodated to input signals of both interlace and progressive systems with less degradation of the picture quality even if the pictorial images are rapidly moved in case of interlace scanning system signal input.

Figure 19:
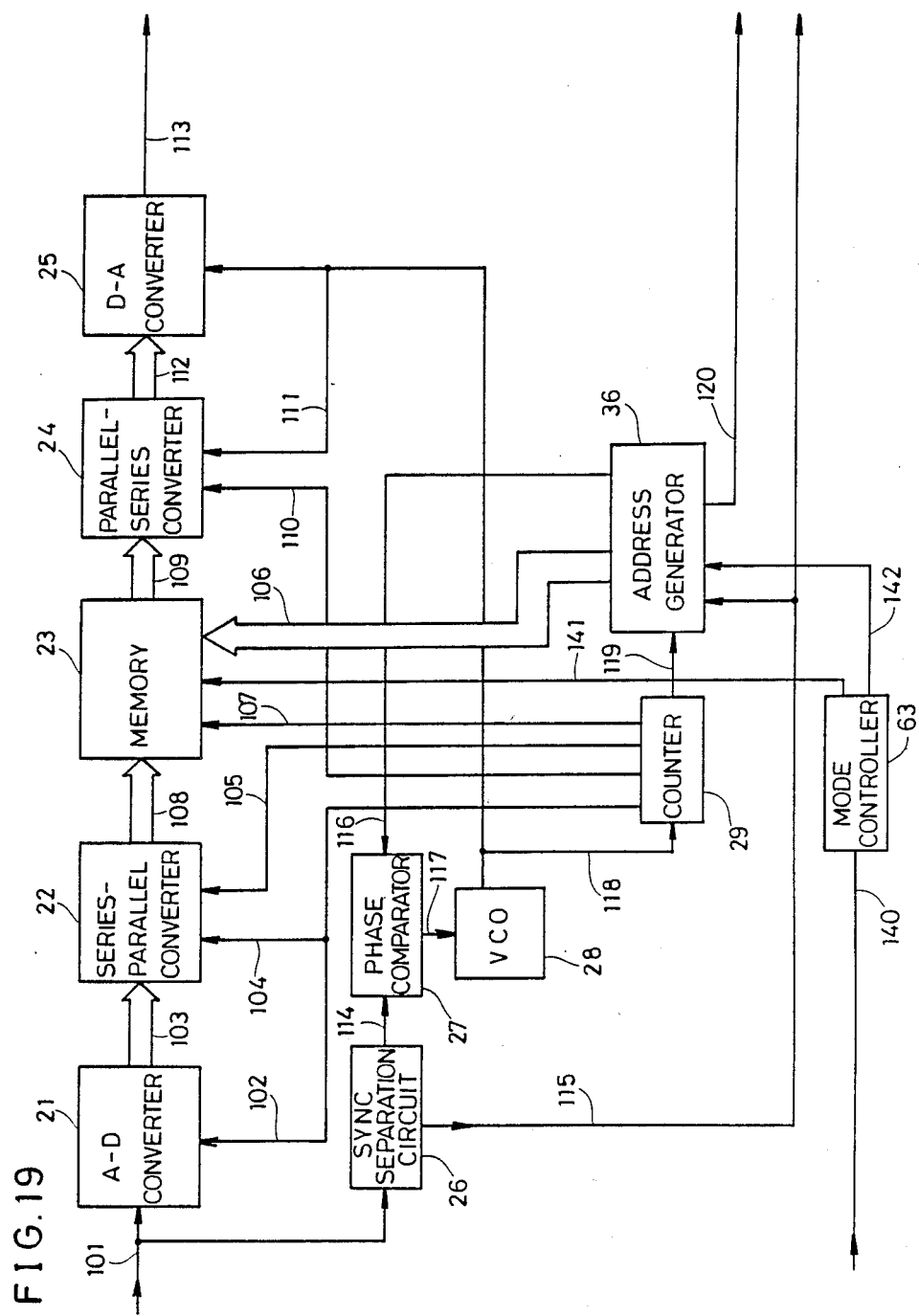
FIG. 19 is a block diagram showing the structure of a sixth embodiment of the present invention.
Figure 20:
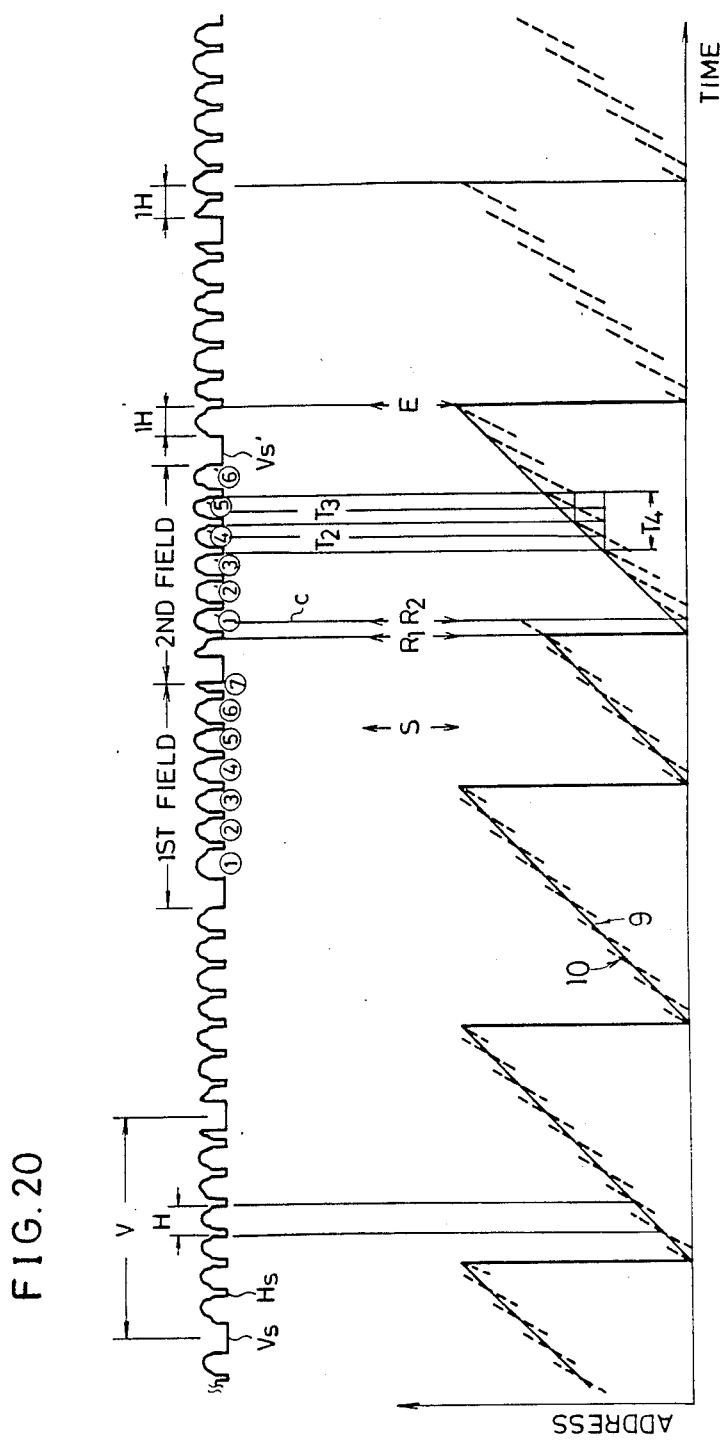
FIGS. 20 and 21 are timing charts showing the operation of the sixth embodiment.
Figure 21:
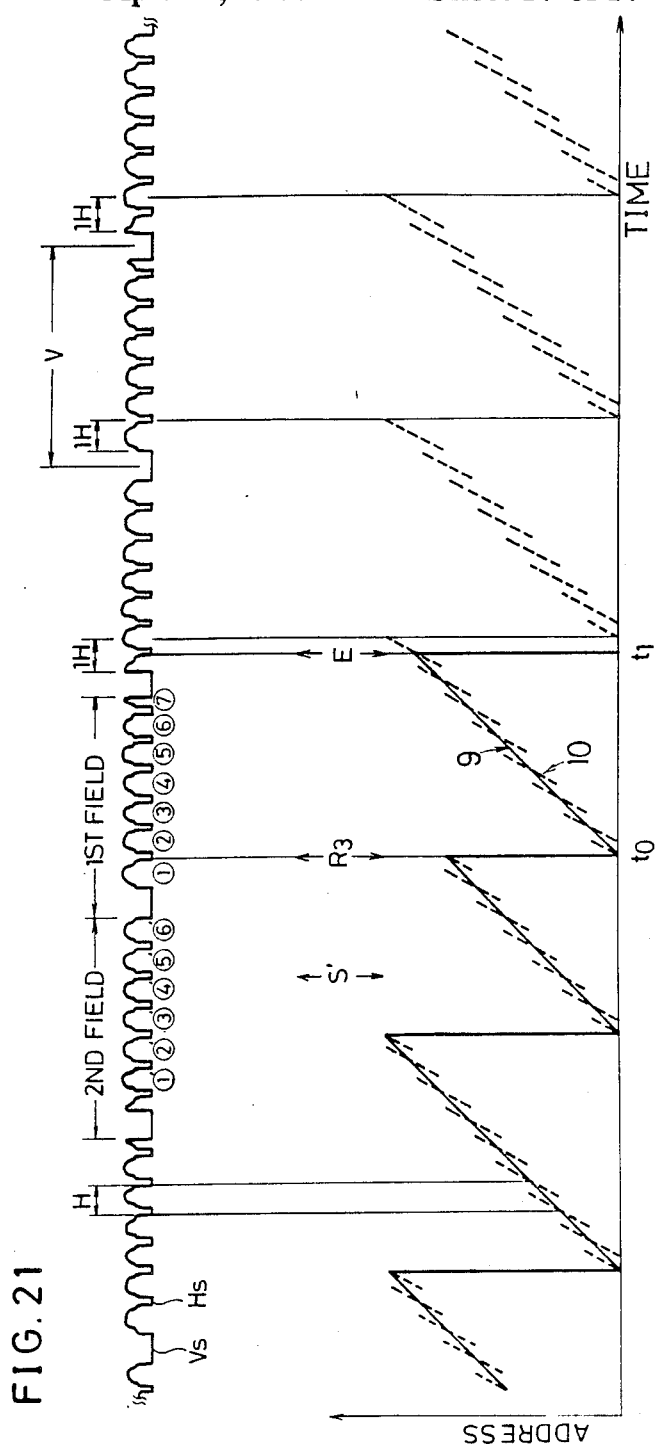

With reference to FIGS. 19 to 21, description is now made on a sixth embodiment of the present invention, which is applied to a scan converter unit suitable for a still picture reproducing operation.

FIG. 19 is a block diagram showing structure of the sixth embodiment. The feature of the sixth embodiment resides in provision of a mode controller 63. Other structure is similar to that of the embodiment as shown in FIG. 7 or FIG. 8, and identical or corresponding components are indicated by the same reference numerals.

The mode controller 63 supplies, by mode switching signals 140 received from the outside, control signals 141 and 142 respectively to a storage unit 23 and an address generator 36 to change generation modes of addresses thereby to set either a scanning conversion mode or a still picture reproduction mode as hereinafter described.

FIGS. 20 and 21 are timing charts for illustrating the operation of the storage unit 23 in the case where the embodiment as shown in FIG. 19 is in the still picture reproduction mode. FIGS. 20 and 21 are also illustrated under the same conditions as FIGS. 9 and 10 as hereinafter described.

The operation of the sixth embodiment is now described.

In the scanning conversion mode, the mode controller 63 receives the mode switching signals 140 from the outside thereby to output signals for operating the address generator 36 and the storage unit 23 at the operation timings as shown in FIG. 9. Namely, in the scanning conversion mode, the sixth embodiment operates along the operation timings of FIG. 9 similarly to the aforementioned embodiment as shown in FIG. 8.

On the other hand, the sixth embodiment performs a specific operation as shown in FIGS. 20 and 21 in the still picture reproduction mode.

In further detail, the mode switching signal 140 supplied from the outside is adapted to instruct the still picture reproduction mode, and when the signal is applied to the mode controller 63, the storage unit 23 performs, by the signals 141 and 142 output from the mode controller 63, the operation for entering the still picture reproduction mode from the scanning conversion mode as shown in FIG. 20 or 21.

Referring to FIG. 20, when, for example, a signal is generated to instruct the still picture reproduction mode at a timing S in the first field, the storage unit 23 is changed from the scanning conversion mode in the following manner:

Writing addresses generated from the address generator 36 are temporarily initialized by horizontal synchronizing signals subsequent present to vertical synchronizing signals of the second field at a timing $R_1$, and the writing operation of the storage unit 23 is stopped upon termination of the writing of video signal information for one field corresponding to one cycle of the entire addresses of the storage unit 23 (timing E in FIG. 3). In this case, stopping the writing operation is merely performed by stopping storage of the data (video signal information), and stepping of the writing addresses is continued in a cyclic manner with 8 lines processed as one circulation cycle.

On the other hand, reading addresses are, in a field (second field) in which the vertical synchronizing signals deviate in phase from the horizontal scanning cycle by ½H, initialized (timing $R_2$ in FIG. 20) at the center C of a horizontal scanning cycle after 1H from termination of the vertical synchronizing signals, while the operation for reading video signal information on the same line already written as shown in FIG. 20 at a speed twice the writing speed repeatedly twice is repeated a plurality of times in circulation cycles of the storage unit 23 in a cyclic manner.

The operation of the storage unit 23 is described with reference to, e.g., a period $T_4$ in FIG. 20. A repeated operation such that information circled 4' written in a period $T_2$ is read in the second ½H of the period $T_2$, and the information circled 4' as written in the period $T_2$ is again read in the first ½H of a period $T_3$. Therefore, information on the same lines is read in a twice-repeated manner. As a matter of course, the respective signals are read in a time-base compressed manner also in this case.

Although the vertical synchronizing signals V's are read only once in the subsequent 1H period, no effective video signal information is included in the horizontal intervals in the vicinity of the vertical synchronizing signals (i.e., corresponding to vertical blanking intervals) in the actual NTSC system, and hence no substantial problem is caused by such operation, as hereinafter described with reference to the first embodiment.

Where signals are generated at a timing S' in the second field for instructing the still picture reproduction mode as shown in FIG. 21, the storage unit 23 is changed from the scanning conversion mode in the following manner:

As obviously shown in FIG. 21, the reading operation of the storage unit 23 is performed similarly to the above case so that writing addresses generated from the address generator 36 are temporarily initialized by the horizontal synchronizing signals subsequently present to the vertical synchronizing signals of the first field at a timing $R_3$. Then the writing operation of the storage unit 23 is stopped upon termination of writing of video signal information corresponding to 7 lines with respect to the storage unit 23 (timing E in FIG. 21).

On the other hand, the reading addresses are in a field (first field) in which the vertical synchronizing signals are matched in phase with the horizontal scanning cycles as shown in FIG. 21, initialized by the horizontal synchronizing signals subsequently present to the vertical synchronizing signals similarly to the case of the writing operation, different from the case of FIG. 20 at a timing $R_3$. The operation for reading the information written in a period $t_0$ to $t_1$ in a twice-repeated manner at a speed twice the writing speed with respect to one line after $t_1$ is repeated a plurality of times with respect to video signal information for effective one field written in the storage unit 23.

In the still picture reproduction mode, although only the video signal information for 7 lines is written in the case of FIG. 21, such operation causes no inconvenience. This is because no effective video signal information is included in the horizontal intervals subsequent to the vertical synchronizing signals (i.e., vertical blanking intervals) in the actual NTSC system, and this is also applicable to the case of FIG. 20. When the unit is employed only in the still picture reproduction mode, the capacity of the storage unit 23 may be adapted to operate for writing information by the number of lines including effective video signal information within one field and twice-repeatedly reading the same with respect to the written information.

As hereinabove described, the video signal information read in a time-base compressed manner is in the field frequency identical to that in the interlace scanning system and doubled in line number of one field picture, and is reproduced as high definition still pictures in the same position with respect to the vertical synchronizing signals, i.e., in the same position on the display unit.

Thus, the change from the scanning conversion mode into the still picture reproduction mode can be easily implemented by slightly changing the mode of generating the addresses as obvious from the timing charts as shown in FIGS. 20 and 21. Further, it may be readily understood that the change from the still picture reproduction mode into the scanning conversion mode can be performed in a similar manner, although detailed description is herein omitted.

In the case of FIG. 21, information read in the first ½H of a respective one line (1H period) in the period $t_0$ to $t_1$ is that ahead of $t_0$ whereby contents of instantaneous still pictures are disturbed, and hence the operation for switching the mode is preferably performed in the second field as shown in FIG. 20. Therefore, preferably a field discriminator is separately provided in the circuit as shown in FIG. 19 so that still picture reproduction of the second field is automatically performed.

Further, the aforementioned still picture reproducing operation may be intermittently performed to enable performance of a special effect such as that called stroboscopic action, while it is also possible to output recorded information (information written in the memory) to a photographic unit (printer) or the like.

Thus, according to the sixth embodiment, the display contents of still pictures are field pictures fixedly displayed on the same position on the screen of the display unit, whereby fine still pictures can be reproduced with reduction of storage capacity of the storage unit employed therefor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A scanning conversion method of converting an interlace scanning system video signal for two fields in an interlace scanning relation, each of said two fields being formed by (2N+1)/2 scanning lines (N being a positive integer), into a progressive scanning system video signal having the same field frequency as said interlace scanning system video signal and having twice as many scaning lines as said interlace scanning system video signal, said method comprising the steps of:
   preparing a storage means haivng addresses capable of at least storing effective signal components included in said interlace scanning system video signal;
   circulating a designation of said addresses of said storage means for each circulation cycle having a period corresponding to N+1 scanning lines;
   progressively writing said interlace scanning system video signal by one scanning line per said designated address; and
   reading twice each of said signal components stored in said addresses subjected to said writing at a speed twice that in said writing, thereby to convert said interlace scanning system video signal into said progressive scanning system video signal.

2. A scanning conversion method in accordance with claim 1, wherein said addresses capable of storing said effective signal components in said step of preparing said storage means are those corresponding to said interlace scanning system video signal for N+1 scanning lines.

3. A scan conversion method in accordance with claim 1, wherein said step of circulating address designation comprises a step of circulating said address designation with a period for N+1 scanning lines of said interlace scanning system video signal being set as one circulation cycle.

4. A scanning conversion method in accordance with claim 1, wherein said step of circulating said address designation at said circulation cycle includes the steps of:
  detecting the ratio of vertical scanning intervals to horizontal scanning intervals of said interlace scanning system video signal, and
  setting the minimum integer greater than the value of said ratio detected by said detecting step as N+1 and circulating said address designation with the period of said N+1 scanning lines as one circulation cycle.

5. A scanning conversion method in accordance with claim 1, further including a step of detecting that said interlace scanning system video signals include signal components indicating movement of pictorial images exceeding a prescribed level,
  said reading step to read, said video signal in a forward field written in said addresses subjected to said writing when no movement is detected by said movement detecting step and subsequently to read said video signal in a current field under writing at a speed twice the writing speed, and to read, in case where presence of movement is detected by said movement detecting step, the same video signal in said current field under writing at a speed twice the writing speed.

6. A scanning conversion method in accordance with claim 1, further including a step of making a determination as to whether input video signal is in said interlace scanning system or said progressive scanning system,
  said reading step to read video signal of a forward field written in said addresses subjected to said writing when said input video signal is determined as in said interlace scanning system by said determination step and subsequently to read video signal information in a current field under writing at a speed twice the writing speed, and to read, in case where said input video signal is determined as in said progressive scanning system, the same video signal in said current field under writing at said speed twice said writing speed.

7. A scanning conversion method in accordance with claim 1, further including a step of repeatedly performing said reading step a plurality of times with respect to one field, thereby to obtain a still picture.

8. A scanning conversion method in accordance with claim 1, wherein said step of circulating said address designation at said each circulation cycle includes a step of stopping said circulation of said address designation every period which does not include effective signal components.

9. A scanning conversion method in accordance with claim 8, wherein said every period which does not include effective signal components corresponds to every vertical blanking period of said interlace scanning system.

10. A scan converter unit for converting an interlace scanning video signal for two fields in an interlace scanning relation, each of said two fields being formed by (2N+1)/2 scanning lines (N being a positive integer), into a progressive scanning system video signal having the same field frequency as said interlace scanning system video signal and having twice as many scanning lines as said interlace scanning system video signal, said scan converter unit comprises:
  storage means having addresses capable of at least storing effective signal components included in said interlace scanning system video signal;
  address designating means provided in relation to said storage means for circulating designating addresses for reading and writing the signal for each circulating cycle consisting of a period corresponding to N+1 scanning lines;
  signal writing means provided in relation to said storage means for writing said interlace scanning system video signal in said addresses designated by said address designating means; and
  signal reading means provided in relation to said storage means for twice reading said signal stored in said addresses subjected to said writing of said signal at a speed twice that in said writing.

11. A scan converter unit in accordance with claim 10, wherein
  said storage means has addresses capable of storing said interlace scanning system video signal for N+1 scanning lines.

12. A scan converter unit in accordance with claim 10, wherein
  said address designating means circulatingly designates addresses for writing/reading said video signal with N+1 scanning intervals of said interlace scanning system video signal being set as one circulation cycle.

13. A scan converter unit in accordance with claim 10, wherein said address designating means includes:
  means for detecting the ratio of vertical scanning intervals to horizontal scanning intervals, and
  means for setting, on the basis of results of detection by said detecting means, the minimum integer greater than said detected ratio as N+1 thereby to set N+1 scanning intervals as address circulation cycle.

14. A scan converter unit in accordance with claim 10, further including:
  movement detecting means for detecting that said interlace scanning system video signal include signal components expressing movement of pictorial images exceeding a prescribed level, and
  reading control means for changing reading timing of said signal reading means on the basis of the result of detection by said movement detecting means (55).

15. A scan converter unit in accordance with claim 10, further including:
  scanning system discriminating means for making a determination as to whether a input video signal is in said interlace scanning system or in said progressive scanning system, and
  reading control means for changing said reading timing of said signal reading means on the basis of said result of detection by said scanning system discriminating means.

16. A scan converter unit in accordance with claim 10, further including:
  reading control means for controlling said signal reading means to continue reading operation a plurality of times with respect to one field.

17. A scan converter unit in accordance with claim 10, further including means for stopping circulation of said addresses of said address designating means in scanning line intervals not including effective signal components.

18. A scan converter unit in accordance with claim 17, wherein
said stopping means stops said circulation of addresses in response to a vertical synchronizing signal of said interlace scanning system.

* * * * *